(12) United States Patent
Perlmuter

(10) Patent No.: US 8,185,445 B1
(45) Date of Patent: May 22, 2012

(54) METHOD FOR PROVIDING BACKGROUND MUSIC

(75) Inventor: Erez Perlmuter, Ramat Gan (IL)

(73) Assignee: Dopa Music Ltd., Ramat Gan (IL)

( * ) Notice: Subject to any disclaimer, the term of this patent is extended or adjusted under 35 U.S.C. 154(b) by 0 days.

(21) Appl. No.: 12/877,208

(22) Filed: Sep. 8, 2010

Related U.S. Application Data

(60) Provisional application No. 61/240,712, filed on Sep. 9, 2009.

(51) Int. Cl.
*G06Q 30/00* (2006.01)
(52) U.S. Cl. ..................... 705/26.1
(58) Field of Classification Search ............. 705/26.1
See application file for complete search history.

(56) References Cited

U.S. PATENT DOCUMENTS

| | | | |
|---|---|---|---|
| 5,041,921 A | 8/1991 | Scheffler | |
| 5,726,909 A | 3/1998 | Krikorian | |
| 5,734,119 A | 3/1998 | France et al. | |
| 6,407,325 B2 | 6/2002 | Yi et al. | |
| 6,728,167 B1 | 4/2004 | Robbins | |
| 6,732,183 B1 | 5/2004 | Graham | |
| 7,379,902 B2 * | 5/2008 | Nagano et al. | 705/26.8 |
| 7,827,300 B2 | 11/2010 | Ingvarsson et al. | |
| 2003/0217170 A1 | 11/2003 | Nelson et al. | |
| 2004/0128198 A1 | 7/2004 | Register et al. | |
| 2005/0030205 A1 | 2/2005 | Konoshima et al. | |
| 2005/0111662 A1 | 5/2005 | Fiedler | |
| 2006/0212442 A1 | 9/2006 | Conrad et al. | |
| 2010/0263020 A1 * | 10/2010 | Harrison et al. | 726/1 |
| 2011/0041146 A1 * | 2/2011 | Lewis | 725/5 |

FOREIGN PATENT DOCUMENTS

| | | |
|---|---|---|
| WO | WO2006031402 | 3/2006 |
| WO | WO2007093080 | 8/2007 |

OTHER PUBLICATIONS

French hooked on videotext as way to work, play, learn; Stanley Meisler Minneapolis Star and Tribune. Minneapolis, Minn.: Oct. 23, 1986. p. 01.M; http://proquest.umi.com/pqdweb?did=54585152&sid=1&Fmt=2&clientId=19649&RQT=309&VName=PQD.*

Michael Morrison, The Power of Music and Its Influence on International Retail Brands and Shopper Behaviour: A Multi Case Study Approach, Monash University, Australia 7, pages.

Prof. Richard Yalch, The Effects of Music in a Retail Setting on Real & Perceived Shopping Times, University of Washington, United States, 12 pages.

Klaus R. Scherer and Marcel R. Zentner, Chapter 16—Emotional Effects of Music: Production Rules, Juslin, P.N. & Sloboda, J.A. (ed.) (2001) Music and emotion: theory and research. Oxford ; New York : Oxford University Press. 32 pages.

Prof. Daniel J. Levitin, Life Soundtracks: The uses of music in everyday life, Draft 1.0, May 11, 2007, Report Prepared for the Exclusive Use of Philips Consumer Electronics, B.V., Eindhoven, The Netherlands.

Mary Madden, The state of music online: ten years after Napster Pew Internet & Amerucan life project, Washington, D.C. 20036, Jun. 2009.

Amir Navot, on the Role of Feature Selection in Machine Learning, Thesis submitted in partial fulllment of the degree of Doctor of Philosophy—Hebrew University, Israel, Dec. 2006.

(Continued)

*Primary Examiner* — Mila Airapetian

(57) ABSTRACT

Apparatus and methods for serving ambient music area described herein.

11 Claims, 20 Drawing Sheets

OTHER PUBLICATIONS

David Owen, The Soundtrack of Your Life, The New Yorker magazine, Apr. 10, 2006, 7 pages.

Clare Caldwell, Sally A. Hibbert, Play That One Again: The Effect of Music Tempo on Consumer Behaviour in a Restaurant, University of Strathclyde, Scotland European Advances in Consumer Research, vol. 4, 1999.

Anneli Beronius Haake, Music listening practices in workplace settings in the UK: an exploratory survey of office-based settings, Department of Music, University of Sheffield, U.K., 9 pages.

Michael Morrison, The Power of In-store Music and its Influence on International Retail Brands and Shopper Behaviour: A Multi-Case Study Approach, Apr. 2002, Department of Marketing, Monash University, Australia.

Michael Beverland, Elison Al Ching Lim, Michael Morrison, Mile Terziovski, In store music and consumer brand relationship: Relational tranformation following experience of (mis) fit, Journal of business research 59 (2006), 982-989, 8 pages.

Gavin Ryan Shafron, The science and psychology behind music and emotions, University of California, Los Angeles, USA, The journal of young investigators, vol. 20, Issue 5, Nov. 2010, 22 pages.

* cited by examiner http://www.visitmaine.com

Lodging
Dining
Activities
Getaways
Events
Regions
Seasons
Resources
Home

Picture of Farm — Agricultural Attractions
Picture of Ferris Wheel — Family Attractions
Picture of Cruise Ship — Cruise Lines
Picture of Race Horse — Gaming & Wagering
Picture of Farm — Wildlife
Picture of Fisherman

*Image Description Of Product Or Service (Category)*
*Text Description Of Product Or Service (Category)*

PRIOR ART

FIG. 2B

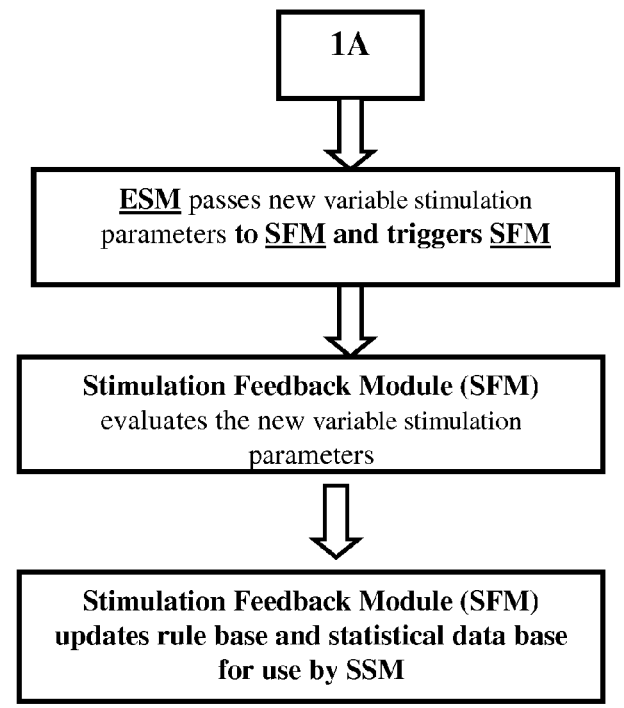
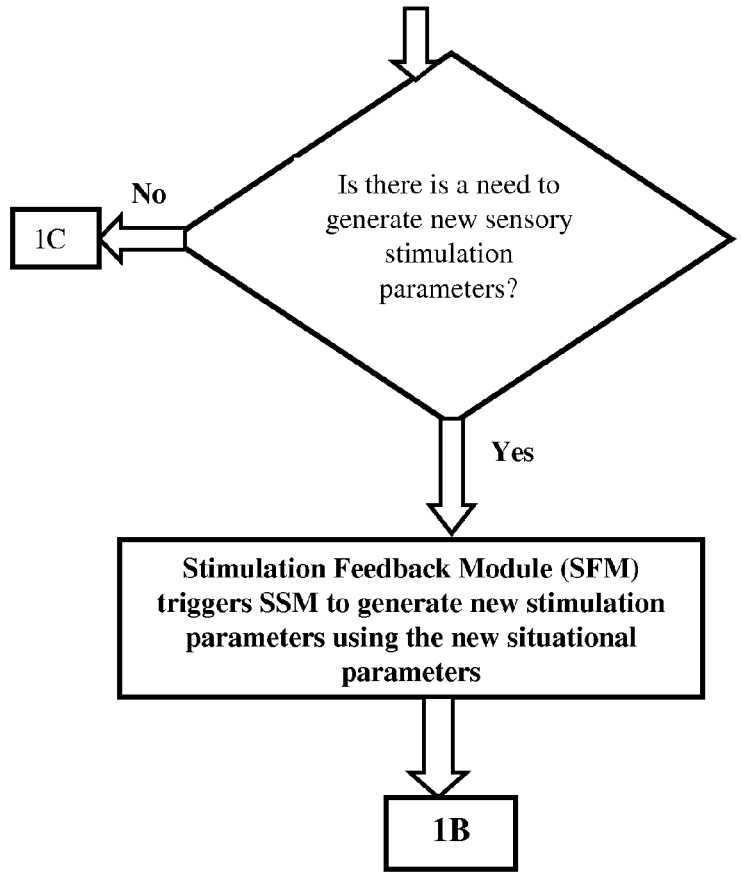
FIG 11A

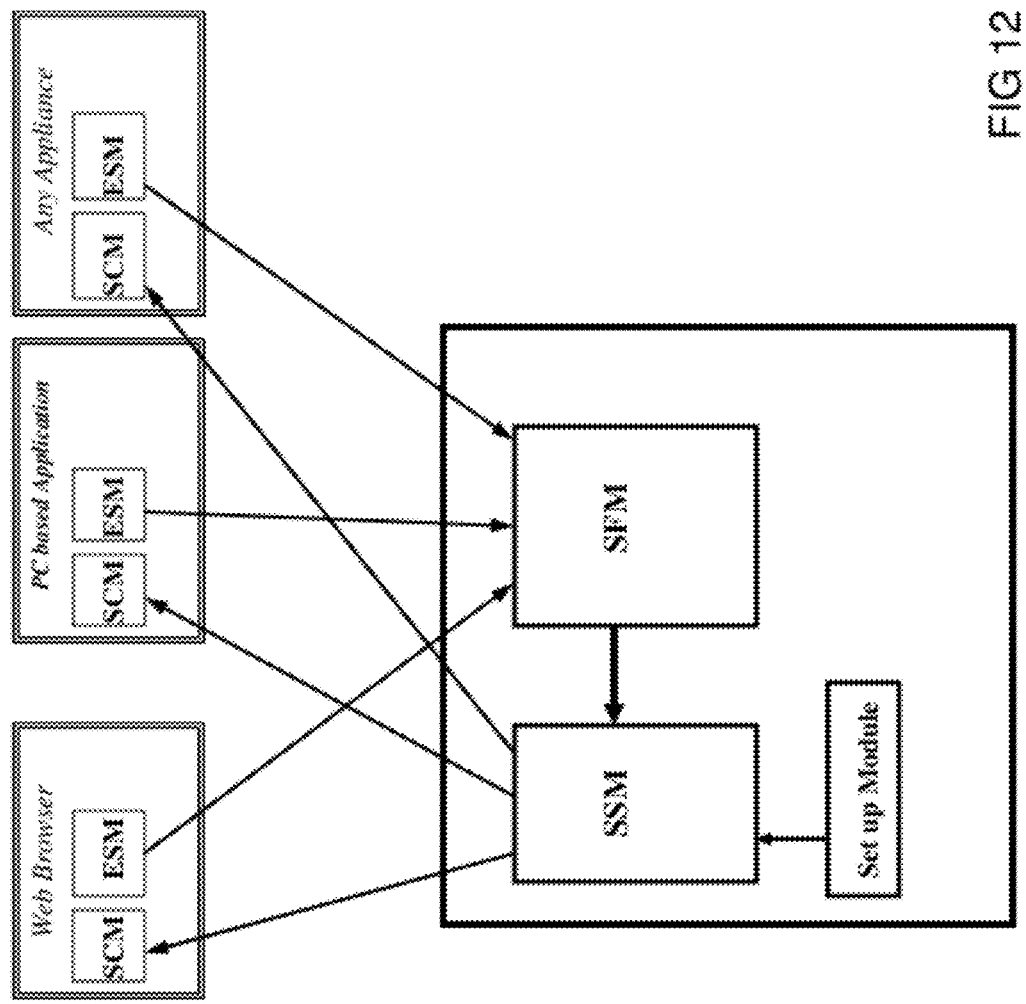

METHOD FOR PROVIDING BACKGROUND MUSIC

CROSS-REFERENCE TO RELATED APPLICATIONS

This patent application claims the benefit of U.S. Provisional Patent Application No. 61/240,712 filed on Sep. 9, 2009 which is incorporated herein by reference in its entirety.

FIELD OF THE INVENTION

Embodiments of the present invention relate to apparatus and methods for providing background music to websites and/or to software applications such as business productivity applications.

BACKGROUND AND RELATED ART

Some embodiments of the present invention relate to 'informational websites' such as branding websites, ecommerce websites, blogs, news websites, or any other news websites. Some embodiments of the present invention relate to computing applications such as 'business productivity' applications (e.g. a word processor application, spreadsheet application, integrated development environment (IDE) for writing computer code, bank software, etc).

FIGS. 1-3 are derived from screen shots of well-known websites. FIGS. 1A-1C relate to an ecommerce website (Amazon.com®), FIGS. 2A-2C relate to a branding website which lacks ecommerce functionality (the 'Visit Maine' travel web site), while FIG. 3 relates to a generic news article website.

One feature that is completely optional for informational websites (i.e. ecommerce or branding or other informational websites) but which, to date, is ubiquitous is the presence of navigational components for navigating the website according to categories of sub-categories. Thus, in FIGS. 1A-1B, the user is presented a menu of categories or sub-categories, and can instruct the website to display products or services by category. It is noted that although it is possible to purchase music via ecommerce sites (including Amazon—see the 'music' portion of the "Movies, Music & Games" category), it is possible to purchase a myriad of products and services (for example, travel services, health services, education services, car-rental services, etc) that have no real connection to music.

As is evident in FIGS. 1C-1D, one visual motif for informational display that is completely optional but quite ubiquitous today is the display of descriptions of a plurality of products or services—the user may be able to 'click' onto one of the 'description objects' (i.e. text description and/or image description) to receive additional information about the product or service, or to initiate a purchase process.

Thus, in the example of FIG. 1C, the user receives a menu of categories of products or services (i.e. non-musical products of services)—a 'small appliance' category, a 'vacuum category,' and a 'grills/smokers' category. In FIG. 1D, individual products (in this case, freezers) are displayed.

FIGS. 2A-2C relate to a 'non-ecommerce' informational website (i.e. Visit Maine) designed to promote the "State of Maine brand." Although the website may be configured primarily to convey information rather than to sell products, this non-ecommerce informational website may include certain structural features that were present in the 'ecommerce' website described in FIG. 1. Thus, in FIG. 2B, certain categories of products or services are described; a plurality of image or text description are simultaneously displayed as a 'batch.'

Another type of information website is a news site. As shown in FIG. 3, it is quite common for news sites (or any informational web site) to include 'primary content' in the central region of the display screen as well as one or more pieces of 'secondary content' such as banner adds or google text ads which for example are either to the side of the screen or displayed near the center of the screen in a manner that is 'offset' from the primary content (for example, a small amount of content set off from a larger amount of primary content by a different found, or within some sort of visual border).

Embodiments of the present invention relate to apparatus and methods for providing background or 'ambient' or 'business' music to informational websites (any web site including but not limited to informational web sites having structures described in FIGS. 1-3) and to software applications such as business productivity applications (discussed below).

Music holds the key to our emotions. It can be exciting and uplifting, playful and funny, or relaxing and laid back. Whatever the mood, we always respond. The same is true for other sensory stimulations.

There is no doubt of the huge increase in the quantity, quality and different forms of sensual stimulations that modern technology has brought to our lives. One cannot sit at a coffee shop, visit a shopping mall or relax at a hotel lobby without hearing background music, stumbling over LCD screens or smelling special scents.

It is widely recognized in retail, restaurants, leisure and other industries that creating the right, customized atmosphere can serve as a powerful tool to communicate brand values, engage with customers and encourage them to stay longer which leads to more sales and brand connection. In a high speed changing, dynamic world, with so much different people with different needs and tastes, it is hard if not impossible to create the right atmosphere for each. Even if you succeed to create the right atmosphere, you need to get feedback, learn and try to optimize the results over time.

SUMMARY OF EMBODIMENTS

A method for serving background music is now disclosed. The method comprises: a) for each non-musical product or non-musical service item of a plurality of items, causing a user terminal in communication with one or more servers via a computer network to display a respective description of the product or service item (for example, so that multiple descriptions are displayed in a single batch); and b) causing the user terminal to play one or more audio songs at a time that is simultaneous with the displaying of step (a) and/or in response to the a user request to display the items.

In some embodiments, the audio songs selected in accordance with the combination of: i) a theme describing the one or more of the displayed non-musical product or service items (or any non-musical theme of non-musical visual content); ii) user-specific or user terminal-specific personal data associated with the user terminal or the user (i.e. to identify the specific users to associate the user with one or more subpopulations); and iii) a non-musical business objective function related to future non-musical purchasing activity or future estimated non-musical surfing activity It is noted that even though songs may be selected and served to a user according to specific visual content (e.g. articles or descriptions of products or services), there is no requirement that the song is 'switched' or 'initiated' at times corresponding to times the user requests visual content or at times that new visual content is displayed.

In one example, the user may click on a link to a non-musical text article (e.g. a non-musical blog entry to a non-musical news article) or the user may instruct a branding site (or ecommerce site or information site) to display visual descriptions of products or services. The user may use any navigation tool including but not limited to navigation tools on the web site (i.e. text books or menus) or any other tools.

In some embodiments, the ambient music served may be closely tied specifically to the non-musical content item (e.g. description of a service or product or other content such as news articles) the user requested rather than to ancillary content not requested by the user. Thus, in some embodiments, the method is carried out such that: i) items whose description is displayed in step (a) are explicitly requested by the user in an explicit user request; and ii) the selection of the ambient music is carried out such that the explicitly-request items have a greater weight than other information or other items displayed on the screen.

Explicit user request for visual content include but are not limited to (i) brand requests for non-musical items (e.g. manufacturer of sporting goods or furniture or household applicants or pet products or any other item) (ii) a 'category request' for a category of products or services (iii) a 'date request' for travel date and (iv) an 'item description text' entered via a text box either on the site or even on an external search engine such as Google® or Bing®.

In some embodiments, the method is carried out such that: i) descriptions of at least some of the items of step (a) are displayed in a primary display region of a screen of the user display; and ii) the selection of the ambient music is carried out such that preference is given to the primary display region of the screen at the expense of region outside of the primary display region.

The optimization of the business objective function may be 'local' or global' In some embodiments, it may be possible to provide greater weight to a 'lifetime value of a customer' rather than to immediate purchasing—in this case, it may be desired to encourage future user or extended use of a website rather than immediate purchase.

The, in some embodiments, the non-musical business objective function optimizes a global estimated future dwell time of a website of the displayed non-musical items of step (a) by the user or a global estimated future purchase parameter of the website the user at the expense of local estimated future dwell time or purchases of any item displayed in step (a). In one non-limiting example, this may be carried out to encourage the user to re-use navigation widgets on the site (e.g. categories menus, etc).

Appropriate user-specific data explicitly identifying a single user or group of user that may be used to select ambient music includes but is not limited to i) a foreign country or foreign time zone of the user terminal; ii) an estimated age of a user of the user terminal (or other demographics) iii) an estimated household or personal income of a user of the user terminal; and iv) a web-navigation path to the informational website which presents the non-musical product or service items.

As is discussed below, in some embodiments, context parameters relating to the 'immediate situation' may also be utilized when selecting songs to serve as ambient music—for example, a list of songs heard by the user or played on the terminal device in the recent past (e.g. in the last week or day or hour and/or in the current use sessions).

In some embodiments, the song selection is carried out according to a large-scale statistical model. This large-scale statistical model may be periodically (i.e. at any time intervals—fixed time intervals or varying time intervals) updated according to detected user behavior to iteratively train and use the updated/trained model.

In some embodiments, the song selection is carried out according to one or more context factors specific to the current session.

Some embodiments relate to a method comprising: a) displaying a block of non-musical free-text including one or more complete sentences (in some embodiments, 3 or 5 or 10 or more free sentences—for example, as in news sites); and b) causing the user terminal to play one or more audio songs at a time that is simultaneous with the displaying of step (a), the audio songs selected in accordance with the combination of: i) a theme describing the one or more of the displayed non-musical product or service items; ii) user-specific or user terminal-specific personal data associated with the user terminal or the user; and iii) a business objective function related to dwell time spent reading the free-text and/or to future surfing and/or requests for additional free-text blocks.

It is now disclosed a method comprising: a) displaying, on a user terminal, non-musical textual content including a multi-sentence article or a multi-sentence blog entry (including at least 2 or 3 or 5 or 10 or any number of sentences); and b) causing the user terminal to play one or more audio songs at a time that is simultaneous with the displaying of step (a), the audio songs selected in accordance with the combination of: i) a non-musical theme of the textual content; ii) user-specific or user terminal-specific personal data associated with the user terminal or the user; and iii) a business objective function related to future estimated surfing activity on a site of the non-musical textual content and/or dwell time reading the current-displayed non-musical textual content.

It is now disclosed a method comprising: a) causing a user terminal to play a plurality of audio songs to a user at a time when the user terminal is locally or remotely running a business-productivity-software application; b) for each audio song, acquiring a respective productivity metric describing user productivity and/or user accuracy at a time that the audio song is playing on the user terminal; c) correlating audio song features with user productivity using the business-productivity software application; and d) at a later time, in accordance with the results of the correlating, causing the user terminal to play background music when the user terminal is, at the later time, locally or remotely running a business-productivity-software application In some embodiments, the business productivity software is selected from the group consisting of: i) a word processing application; ii) an email application; iii) a software utility application; iv) a development environment; v) a graphical art generation application; and vi) a spreadsheet application.

It is now disclosed a method comprising: a) visually providing, on a user terminal, business productivity software application functionality to a user; and b) causing the user terminal to play one or more audio songs at a time that is simultaneous that the user engages the business productivity software, the audio songs selected in accordance with one or more production and/or user accuracy metrics describing usage by the user of the business productivity software.

In some embodiments, the songs are selected according to a deviation parameter describing a deviation between current productivity or accuracy parameters of the current session and their historical counterparts.

In some embodiments, the audio songs are selected according to a textual theme of non-musical content input via the business productivity software.

In some embodiments, the audio songs are selected according to a context parameter of the software use.

In some embodiments, it may be possible to utilize 'feedback information' about online ambient music that was successful to configure in-store brick-and-mortar systems for serving music.

Different embodiments relate to apparatus, systems and computer-readable medium storing computer-code for carrying out any routine disclosed herein.

BRIEF DESCRIPTION OF THE DRAWINGS

FIGS. 2A-2C describe views of a branding website (PRIOR ART).

FIGS. 4, 7-8, 11, 11A and 14 present flow charts of routines related to the serving of music.

FIGS. 5-6, 9-10, 12-13 are block diagrams of apparatus related to the serving of music.

DETAILED DESCRIPTION OF EMBODIMENTS

Figure 1A:
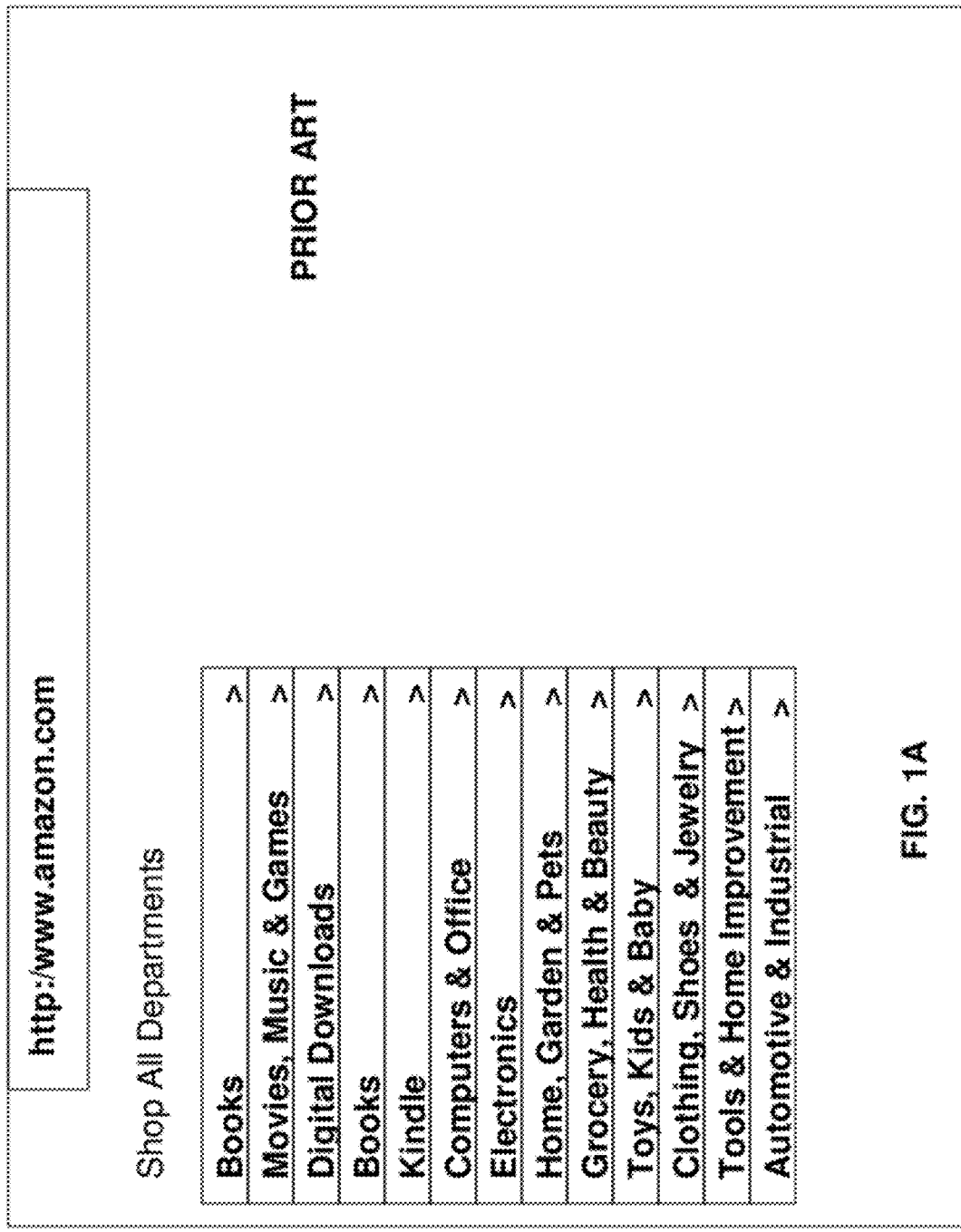
FIGS. 1A-1D describe views of an ecommerce website (Amazon.com®) (PRIOR ART).
Figure 1B:
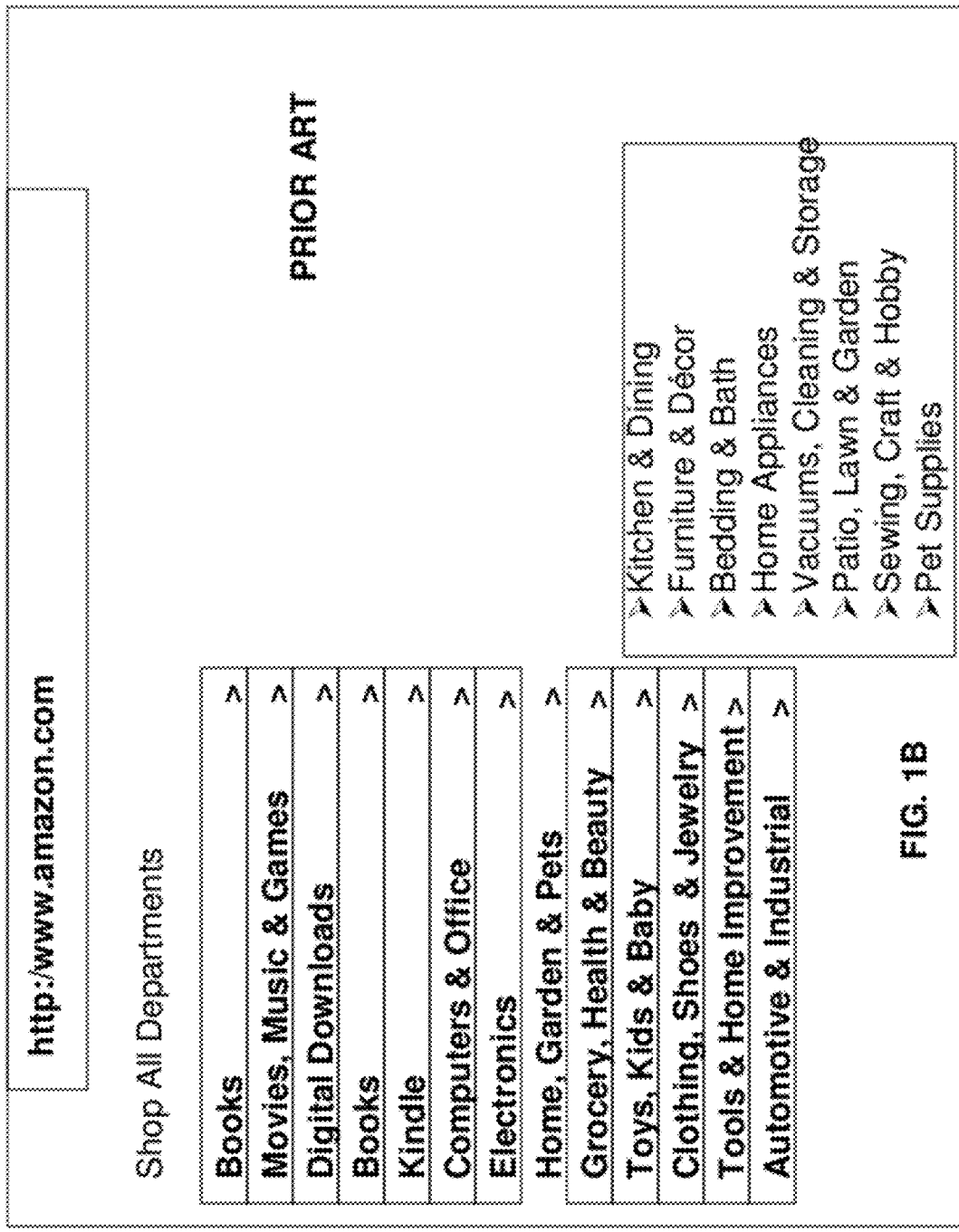
Figure 1C:
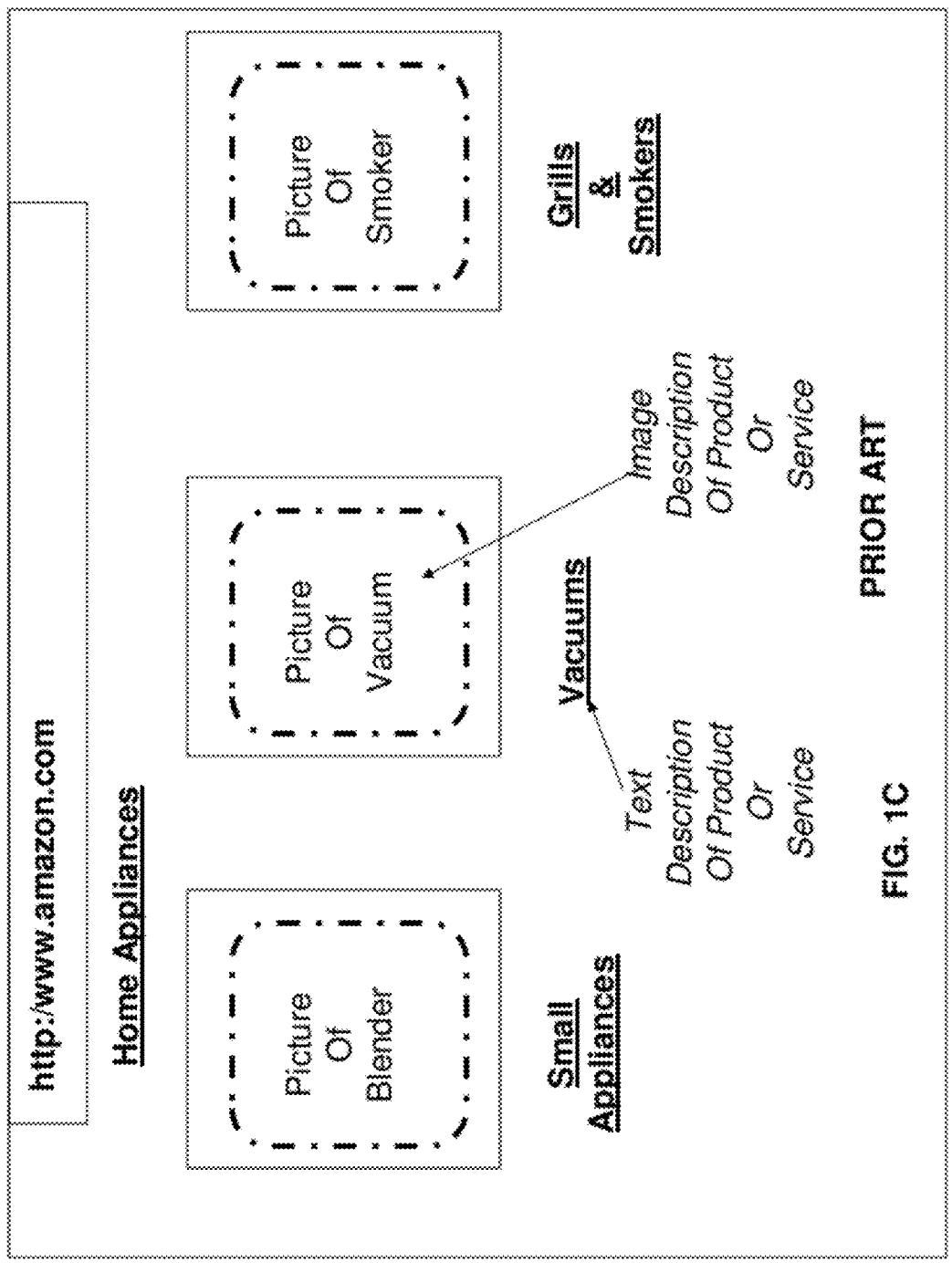
Figure 1D:
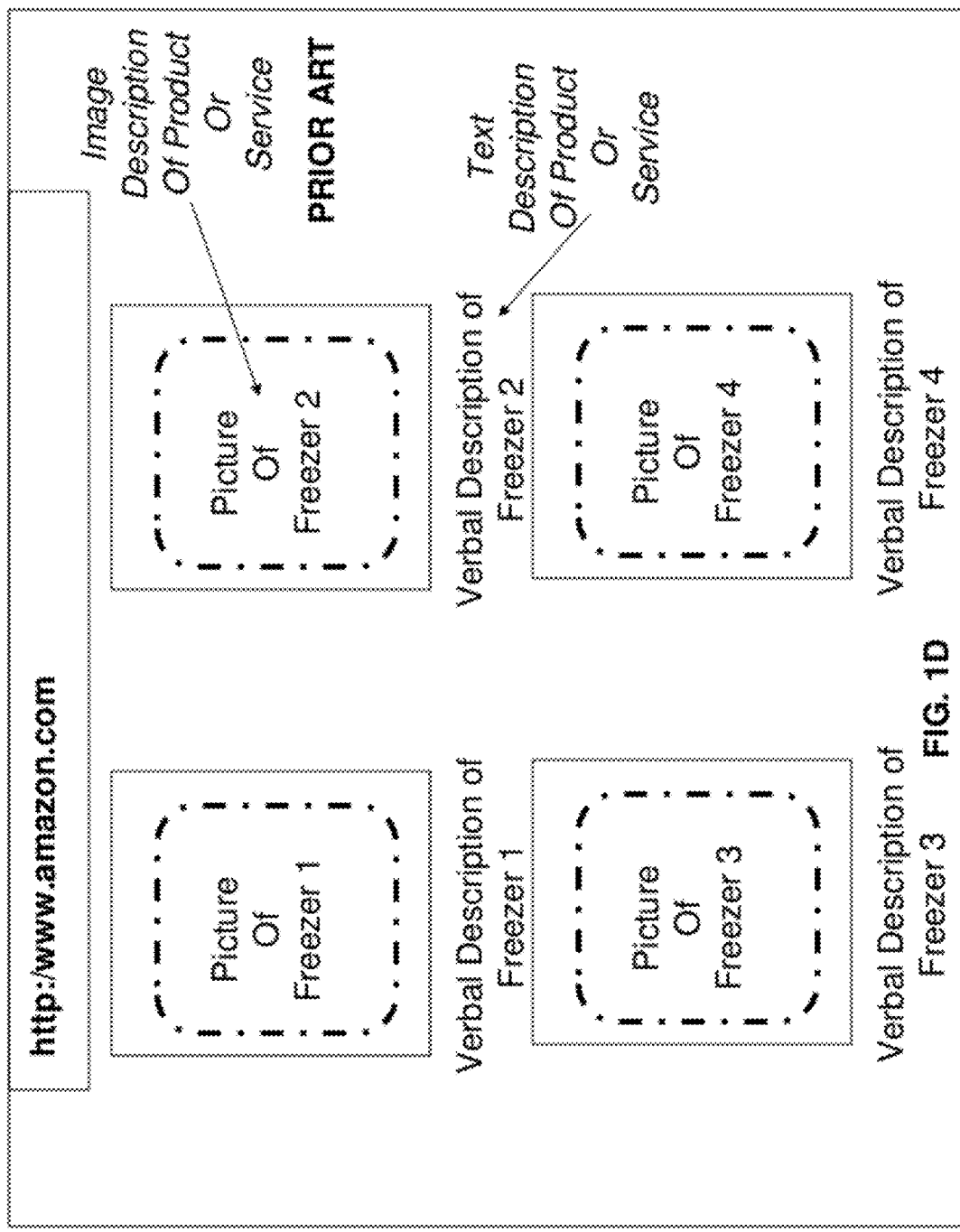

In the following detailed description, numerous specific details are set forth in order to provide a thorough understanding of the invention. However, it will be understood by those skilled in the art that the present invention may be practiced without these specific details. In other instances, well known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, flash memory, optical disks, CDROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus. Anywhere in the description where a database is referred to, the reference should be deemed to refer to any type of data storage and may refer to storage in multiple locations.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Embodiments of the present invention relate to apparatus and techniques for providing background music in the context of an informational web site (e.g. a branding website, an ecommerce website, a news website, a blog, or any other informational website) and/or a software application (e.g. a business productivity software application).

In contrast to 'music listening software' where a user may explicitly request one or more songs or may explicit provide a local or online software application with music taste data in order to listen to one or more songs, the 'background' or 'ambient' or 'business' music may be served to the user without any request for music. Furthermore, although the listening pleasure of the user may certainly be a factor when serving music to the user, the criteria used for selecting the songs may also reflect an 'agenda' that differs from the mere listening-pleasure of the user.

This is consistent with the concept of 'background music'—the music selection criteria applied by a restaurant or bank when selecting background music is necessarily different form the music selection criteria applied by a listener when s/he explicitly seeks to listen to music.

Thus, in one example, a proprietor of an ecommerce or information web-site may select songs according to their ability to obtain certain desired behavior such as the purchasing products or services or the browsing of non-musical content on the website. In another example, a business productivity software application (e.g. a word processor application, spreadsheet application, integrated development environment (IDE) for writing computer code, bank software, etc) serves background music in an attempt to cause the user to use the software more productively (e.g. type with fewer grammatical or spelling errors, write more text, erase less text, etc). The desire to maximize sales and/or 'dwell time' on web sites (i.e. the amount of time the user remains on a web-site such as a branding site or an ecommerce site) and/or 'future clicks' on the web site and/or productive usage of a business software package relate to 'business objective functions' which may impose constraints upon the selected songs that are not completely harmonized with (and may even contradict) the mere goal of the user's listening pleasure.

As will be discussed below, the present inventor has found that serving the music in accordance with a number of factors (in some embodiments, this may include various context parameter(s), user-specific parameters, business objection function, and/or one or more non-musical themes of non-musical visual content displayed on the website) is useful for promoting non-musical products or services or brands and/or promoting productive use of business software applications.

Embodiments of the present invention relate to 'selection' of songs from a database of songs that are served to the user as ambient or background or business music. It is noted that usage of the proper selection criteria and the proper combination of selection criteria may mean the difference between 'naively' or 'robotically' selecting songs whose result is far from optimal, and intelligently selecting songs that accomplish the objective of obtaining the desired user-behavior of the business objective function.

In the following section, a number of 'decision criteria' are explained 'in isolation' (or nearly in isolation) from other decision criteria. It is cautioned that the scenarios relating to the 'isolated' or 'nearly-isolated' decision criteria may be oversimplified, and in various embodiments, it is specifically the combination of several or many factors which achieves the desired result. Nevertheless, for the sake or clarity, and as a heuristic, several 'naïve scenarios' relating to isolated or small combinations of song-selection decision criteria are now explained Scenario 1 Related to Isolated Music-Selection Criteria (Certain Very Basic Features)

A 'wine store' ecommerce or branding website sells wine from different countries. In this example, the wine website will be named www.verynicewine.com.

The wine store website includes navigation interface components that allow the user to browse wines by country—for example, the user can select that the website displays Spanish wines, Italian wines, Greek wines, French wines, Australian wines, etc.

In this non-limiting use case, when the user requests Greek wines, a matrix or list of Greek wines are displayed—for example, for each particular Greek wine of a plurality of Greek wines, a respective picture of the wine bottle and/or text description of the wine is displayed. Similarly, when the user requests French wines, the French wines are displayed' when the user requests Spanish wines, the Spanish wines are displayed, etc.

According to this use case, the servers of the branding or ecommerce web-site cause the user's terminal to play Spanish music in response to a request to display Spanish wine; the servers of the branding or ecommerce web-site cause the user's terminal to play French music in response to a request to display French wine, etc.

In some implementations, the user may request information about wines (or a certain type of wine) by sending a request via a computer network (e.g. the Internet). For example, the website might include one or more navigation components for this purpose. Navigation components may include (i) a text box where the can type in 'Greek' or 'Italian' or 'French'; (ii) some sort of graphical map of Europe where the user can click onto a requested country; (iii) some sort of side-bar menu.

Scenario 2 Related to Isolated Music-Selection Criteria (a Context Feature)

In this example, it is possible to determine how the user 'entered the site' or 'entered a sub-section of the site.' For example, the web site www.verynicewine.com may have purchased identical banner ads (i.e. directed to the site as a whole) on (i) an upscale gourmet cooking website dedicated to fine food (www.gourmetfoodlovers.us); and (ii) a youth-oriented website focusing on college students or recent graduates (www.youngadultsparty.com).

In a first situation, a user browsing www.gourmetfoodlovers.us clicks on the banner ad from www.verynicewine.com to enter the site. The user then requests a list of Spanish wine. In a second situation, a user browsing www.youngadultsparty.com clicks on the banner ad from www.verynicewine.com to enter the site. The user then requests a list of Spanish wine. In both situations, the same list of Spanish wine may be displayed to the users, or different lists of Spanish wine may be displayed to the user.

In both situations, Spanish background music may be played after the user requests display of Spanish wine products. However, knowledge about the context of how the entered the site (www.verynicewine.com) may also influence the choice of background or ambient music 'served' to the user at the time that the list of Spanish wines are displayed.

For example, the user that entered from www.gourmetfoodlovers.us may receive classical Spanish music config-ured to play at relatively low volume. In contrast, the user that entered from www.youngadultsparty.com may receive loud Spanish rock-and-roll configured to play at relatively low volume.

Another important context is the time, day of the week, date (holidays), etc., when the user begun his session.

Scenario 3 Related to Isolated Music-Selection Criteria (Learning System)

In this use case, it is possible for the system to track how various songs (or combinations of songs) may influence overall wine sales or the overall amount of time spent on the website or the overall number of 'referrals' or any other desired business goal.

In one non-limiting example, each song or list of songs may be assigned some sort of effectiveness score.

For example, during a one-week period of time, five Spanish 'candidate songs' (Song 1, Song 2, Song 3, Song 4 and Song 5) may be served to users (i.e. either the overall population of users, or a sub-population of users such as young users or old users or affluent users or middle-class users or any other sub-population) with equal frequencies. Initially, each song is played with a frequency of 20%.

Over time, it is possible to track the 'effectiveness' of each song by measuring how each song influences sales (i.e. sales in general or sales of a preferred item) and/or the browsing patterns of users.

In general, songs which tend to increase the sales level and/or increases the amount of 'dwell time' on the site will receive a higher score.

In response to the higher score, these songs may be 'served' to users with a higher frequency. For example, if "Song 3" appears to "achieve good results," the system may detect this result, and begin to serve "Song 3" to users at an elevated frequency.

Scenario 4 Related to Isolated Music-Selection Criteria (Tracking Individual Users or Groups of Users)

According to 'use case 4,' it is possible to determine which users (i.e. either individual users or groups of users) are more influenced by certain songs, and to adjust the frequency at which songs are served to users accordingly.

Thus, in this use case, when each of the five 'candidate songs' are played, the resulting metrics (i.e. influence on sales or user surfing habits or referrals or any other desired business goal) are measured not only globally but also for specific groups.

In one example, it may be determined that while "Song 3" increases overall sales of Spanish wine in the general case, for the specific case of users who entered the website via www.youngadultsparty.com, "Song 2" achieves results (i.e. in terms of sales or how long users surf the site or any other business goal) that are superior to the results achieved when "Song 3" is served (i.e. in response to a request for the visual content and/or simultaneous with the presenting of the visual content).

In this use case, the initial song frequency distribution for both the overall population of users (and also for the sub-population) is a uniform distribution, with each song being played 20% of the time. However, after a certain amount of time, the system learns. After this amount of time, "Song 3" may be served most frequently to the overall population (i.e. simultaneous with and/or in response to a request for a list of wines—for example, Spanish wines) while "Song 2" may be served most frequently to the subpopulation of users who entered the site via www.youngadultsparty.com.

Some songs may be identified as songs which are effective at increasing 'on-the-spot' sales, but less effective at encouraging the user to spend a lot of time on the site. Others may have the opposite effect.

In one non-limiting example, certain fast songs with a 'catchy tune' might encourage users to 'close the deal' and purchase more wine, while other songs (for example, a slow, pleasant and sweet song) might not increase sales at much but might encourage the users the spent more time on the site.

Scenario 6 Related to Isolated Music-Selection Criteria (Business Goal Varies in Time or Per User or Per Group of Users)

Depending on a business goal, it may be possible to select songs to serve to users accordingly.

In one example, during a certain week, the inventory of wine held by the store is relatively low. In this example, music which encourages users to visit the site often and/or to browse the site for a long time may be preferred over music which encourages 'on-the-spot' sales. Knowledge of what music 'encourages' may be based upon historical records.

In another example, it may be determined that a certain user is not a 'big spender.' However, this user might have a lot of Facebook® friends or LinkedIn® connections. In this case, it might be preferred to serve this user songs which are known to encourage frequent visits to the site and/or longer visits to the site in the hopes that this person can influence opinion in favor of the site.

In yet another example, the wine store may have an oversupply of Spanish wine and may wish to 'unload' the Spanish wine. In this case, the web site may serve Spanish music even to users who browse through a list of Greek Wines.

Figure 6:
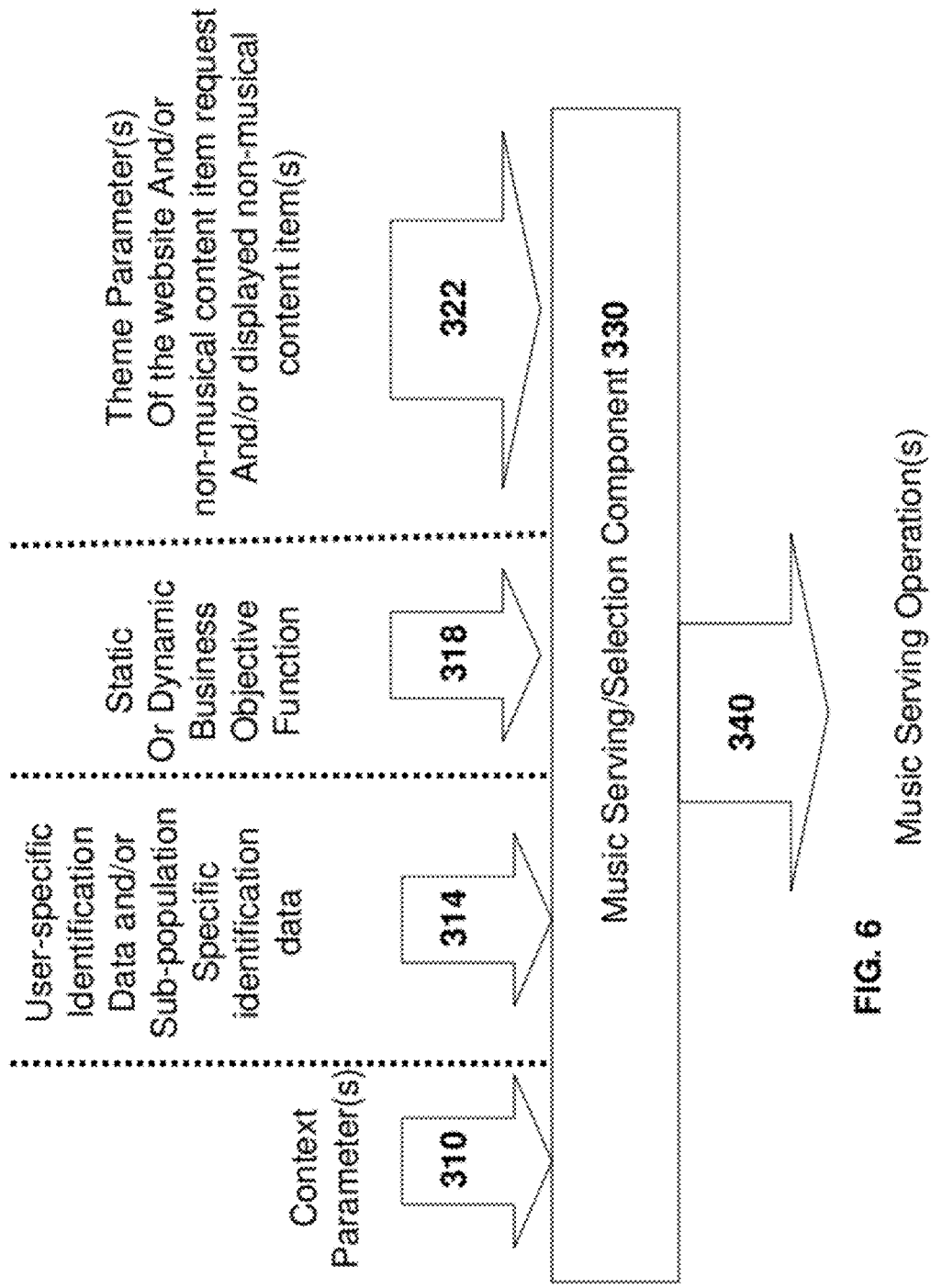
Figure 7:
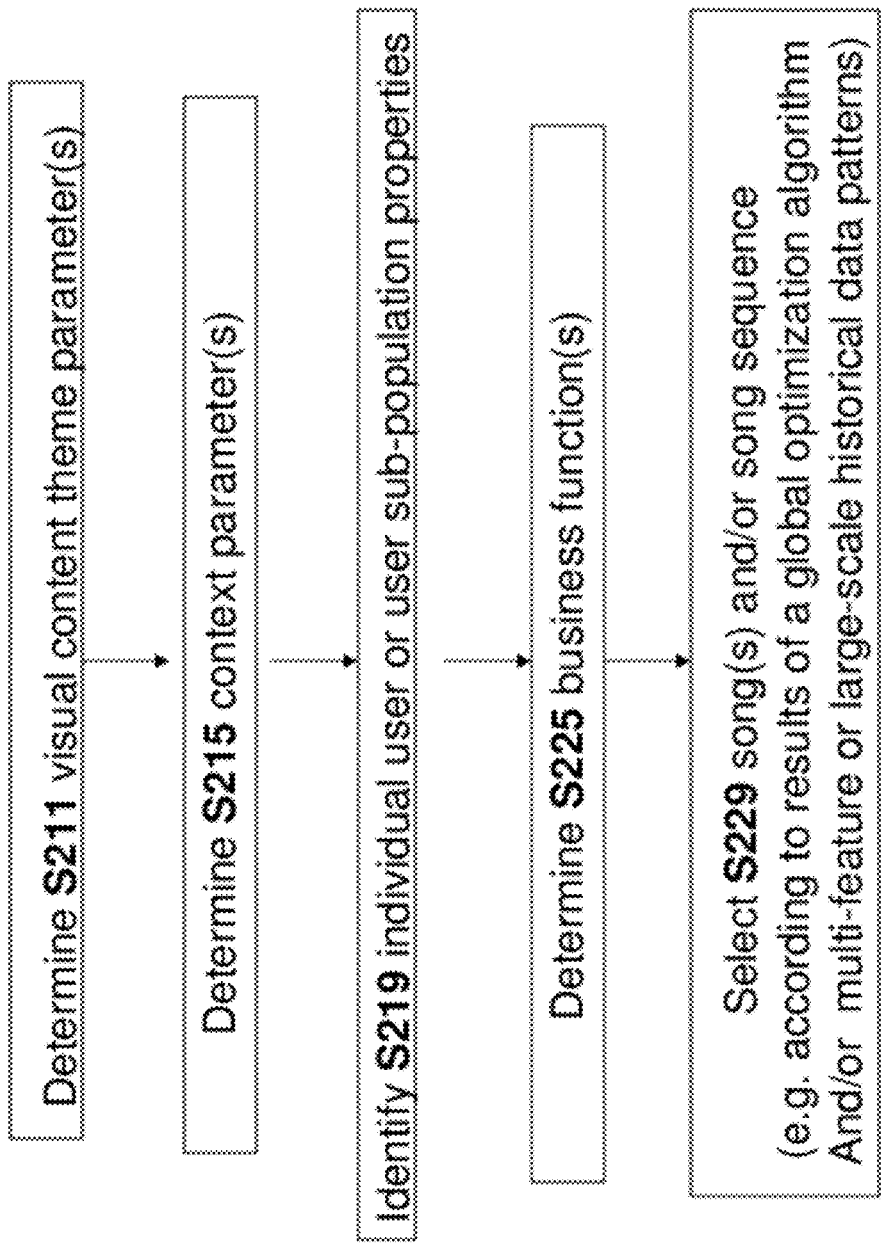

Thus, business goals (incorporated in music selection as 'non-musical business objective functions—see element 318 of FIG. 6 and step S225 of FIG. 7) may vary as a function of time and/or per user and/or per groups of users.

Scenario 7 Related to Isolated Music-Selection Criteria (Tracking Individual Users or Groups of Users)

It may be possible to track individual users or sub-populations of users according any combination of criteria (i.e. at least 1 or at least 2 or at least 3 or at least 4 or all 5 of the following), including but not limited to:
  (i) the locality of the user—for example, certain songs may be more effective at boosting sales from Midwestern users while other songs may be more effective at boosting sales from East Coast users;
  (ii) the amount of time that a user spends on the site—for example, users who tend to spend more time on the site may be served music that is more specific to the types of products (i.e. Spanish vs. Greek wine, price range, red vs. white) while users who visit less frequently and/or come for shorter visits to the site might be served music with a greater general popularity;
  (iii) the user's behavior on the website—some users may be identified as buyers, and other users may be identified as browsers who do not buy.
  (iv) Estimated demographic parameters—e.g. age, household income, etc.
  (v) Language used on user's Terminal Scenario 8 Related to Isolated Music-Selection Criteria (Additional Context-Related Features)

In one example, it may be possible to track the history of songs served to a given user—either on the site itself (e.g. the wine site) or through a business partnership with other sites that may serve music.

In this example, it may be possible to serve songs in a manner that avoids serving the same song too often within a period of time. For example, even if "Song 3" is known as effective for encouraging sales of Spanish wine among the total population of users or among an 'extremely relevant sub-population,' if a particular user has heard "Song 3" recently, it may be preferred to serve a different song other than "Song 3" to this user.

In another example, it may be possible to determine what sequences of songs achieve business goals (for example, browsing on the site and/or purchase of non-musical products). For example, even if "Song 4" is not particularly effective on its own, it may be determined that the sequence "Song 5 and then Song 4" is effective.

In this case, if a particular user had not recently heard "Song 5," it may be preferred not to serve this user "Song 4." However, if a particular user had indeed recently heard "Song 5," it may then be preferred to serve this user "Song 4."

This concept of avoiding repeats may be applied on a number of levels—for example, a per-user level, an overall population level or for any given sub-population.

DEFINITIONS

For convenience, in the context of the description herein, various terms are presented here. Other terms may be described and/or defined at other locations in the present disclosure. For terms defined here or anywhere and to the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

The term 'user terminal' relates to any digital computing device—for example, including a display screen (and/or video port) and/or a speaker (or audio port). In some embodiments, the user terminal (or terminal device) may be networked with other devices (for example, via a local or wide-area computing network such as a cellular telephone network or circuit-switched network or packet-switched network or any other computer network) In other embodiments, the user terminal (or terminal device) may function, for the purposes of one or more teachings disclosed herein, as a 'stand-alone' device.

Examples of user terminals include but are not limited laptop computing devices, desktop computing devices, tablet devices, mobile telephones (e.g. cellular phones), LCD touchscreen devices, and personal digital assistants (PDA).

For the present disclosure, an 'explicit music request' is an explicit request to hear a piece of music. 'Explicit music requests' are one example 'music-related requests'—for example, requests that have a clear connection to music or describe music (i.e. either the request itself or the combination of the request and its context is connected to music). For example, listing the name of an artist or music genre is one example of a 'music-related request.'

In contrast to 'music-related requests' are 'non-musical request' which do not have a clear connection to music—for example, (i) a request to a news site to display a sports article about a baseball game or a news article about international peace talks, (ii) or a request to an ecommerce or branding site to display certain types of automotive products or home improvement products or pets-related product or office-equipment products or other clearly non-musical products or (iii) a request to a travel site for hotel or flight or car-rental information.

Figure 2A:
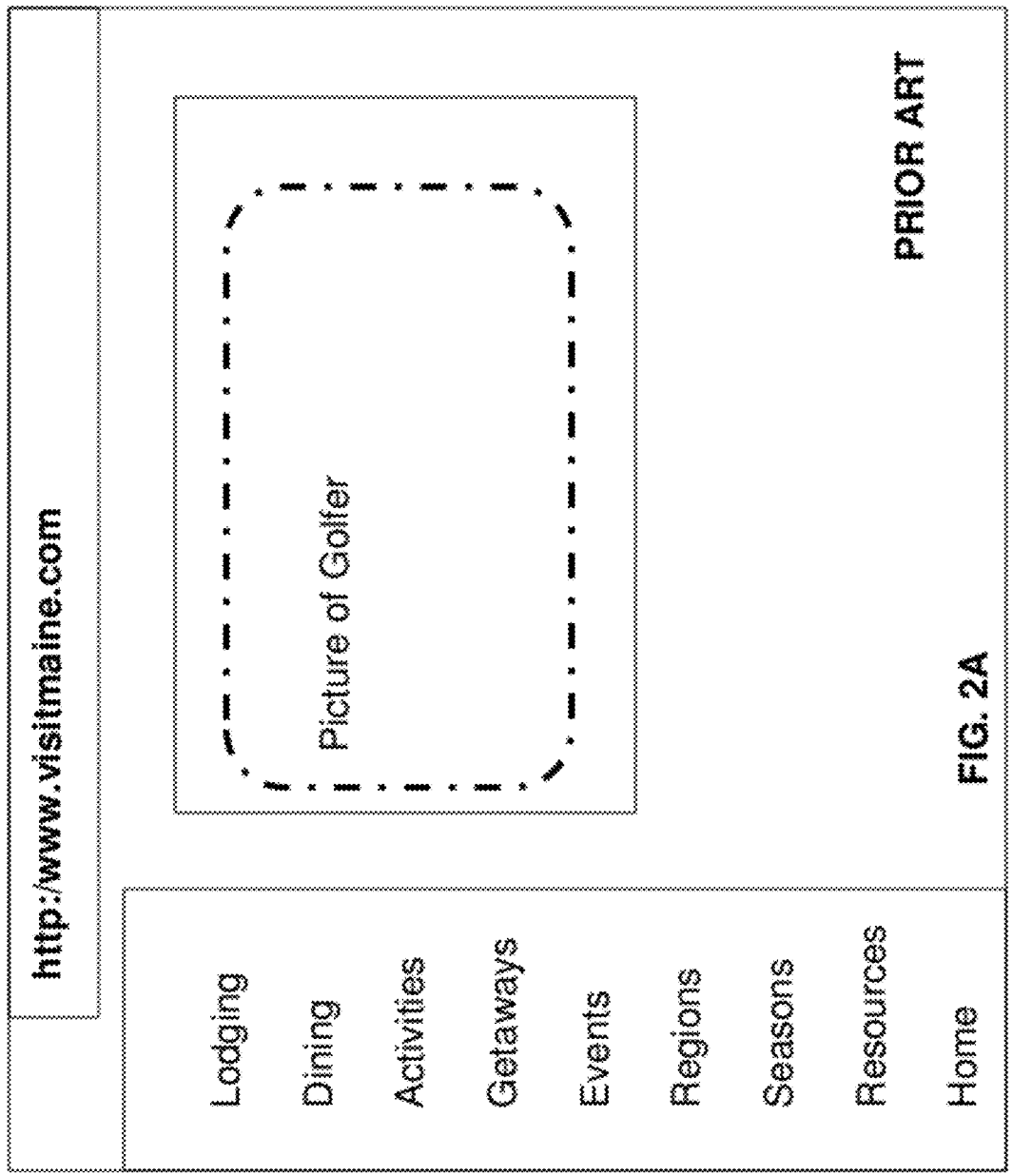
Figure 2C:
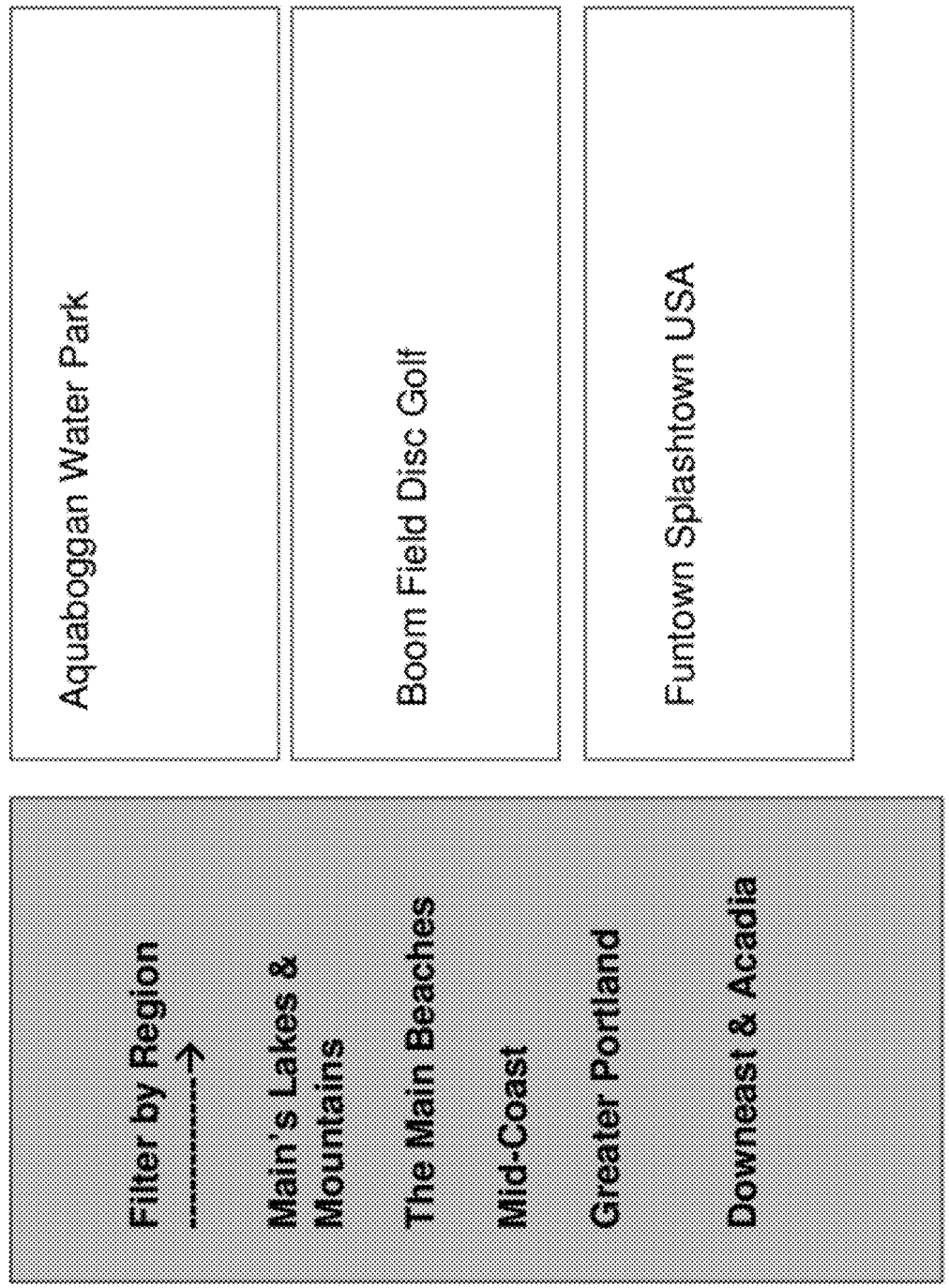

Similarly, visual data that is displayed may be musical or non-musical. An album cover or a picture of a musician (or band) or a text-description of a composer or genre of music may be considered 'musical visual content.' Visual data that has no clear connection to music (for example, the content of the news article about the baseball game, or a description of a home appliance, or a picture of a fly-fisherman in the context of recreational services) may be considered 'non-musical visual content.' One example of non-musical visual content (see FIGS. 1-2) is a description of non-musical products or services.

Ambient or 'background' or 'business music' is music provided in accordance with and/or in the context of the display of visual non-musical content. This music is usually served to a user for a 'non-musical' business purpose—for example, in order to promote purchase of a non-musical product and/or non-musical service and/or in order to promote exposure of the non-musical product and/or non-musical service and/or in order to promote a non-musical brand and/or in order to promote usage of a non-musical web-site or non-musical portion of a web site. These business goals are 'non-musical' rather than for the purpose of promoting music or a related music product. This is analogous to the supermarket or coffee shop or Walmart® store which may provide ambient or background music for the 'non-musical business purpose' of selling (or promoting) services or merchandise other than music-related services or merchandise.

The 'serving of a song' or of a 'music item' relates to causing the user terminal to play (i.e. either via an 'onboard' speaker or an audio port) the song or the music item. Any relevant operation (for example, decoding of digital audio content) may take place on the user terminal itself and/or any other device. In one non-limiting example of 'serving music' or 'serving a song,' digital audio content is streamed to a user terminal via a computer network. In another non-limiting example of 'serving music' or 'serving a song,' a link to digital audio content is sent to a user's browser. In another non-limiting example of 'serving music' or 'serving a song,' audio content is pre-stored on the user terminal, and it is possible merely to send an address or command or other data which 'triggers' the playback of the pre-stored audio content.

Embodiments of the present invention relate to the case where music is served according to one or more (i.e. any combination of) 'context parameters' (see 310 of FIG. 6; see S215 of FIG. 7). The term 'context parameter' relates to the time-immediate or 'real time' situation in which the user is requesting and/or being served non-musical visual content. Ambient or business or background music may be served according to the context parameter.

The terms 'ambient music' and 'business music' and 'background music' are used interchangeably and synonymously and relate to music served to a user for a 'non-musical purpose' much as ambient music is provided in coffee shops or supermarkets or banks. This is in contrast with 'user-requested music' or music provided in the context of explicit listening to music. The term 'business music' also relates to the business purpose of the music—rather than relating exclusively to or primarily the purpose of the user's listening pleasure, the business music is typically a combination of (i) business goals of the web-site proprietor or site owner or the user's boss (for the case of business productivity software); and (ii) the user's tastes or preferences only inasmuch as they advance the aforementioned business goals (for example—promoting non-musical product or service or improving business productivity). Thus, the preferred song according to the business goal might deviate from the preferred song according to the user's listening tastes (though there may be some rough overlap or relation).

Figure 4:
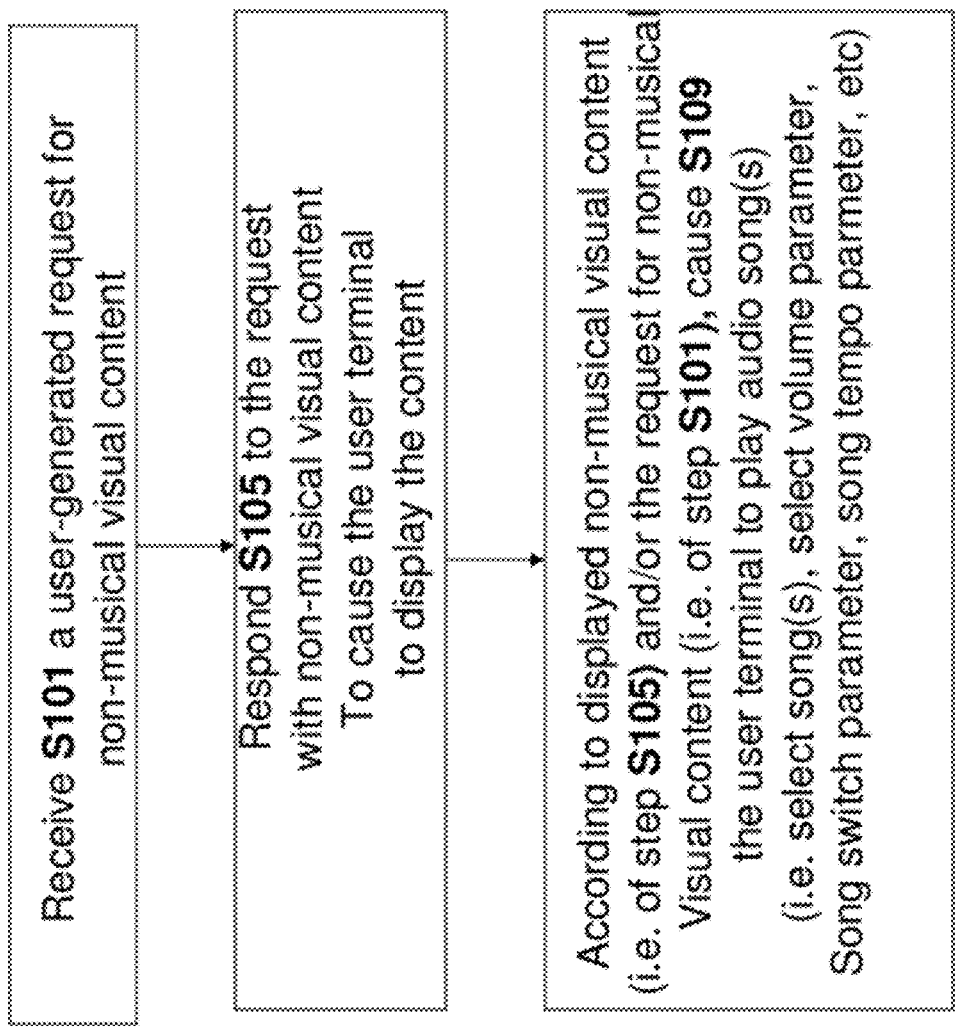

FIG. 4 is a flowchart of a routine for serving music according to some embodiments. It is appreciated that, as with all figures, not every step (or not every component) is required in every embodiments—furthermore, steps may be performed in an order different from what is explicitly described in the figures (or accompanying text)—similarly, components may be arranged in a manner different from what is explicitly described in the figures (or accompanying text).

In step S101, a user-generated request for non-musical content is generated at the user terminal—for example, the user engages buttons of a keyboard and/or a touch screen to indicate a request for some sort of content. In another implementation, the request for content may be provided via a user gesture (for example, detected by a camera) and/or by a voice command entered via a microphone. This user-generated request may, in some embodiments, be forwarded by the client device 1100A to one or more servers 1100B (see FIG. 5). In another implementation, there is no need for inter-device communication, and everything may take place within a single device.

In step S105, in response to the user-generated request for non-musical content, this non-musical visual content is made visible on the display screen of the user device. For example, an ecommerce site may display respective product descriptions for each product of a plurality of non-musical products. In another example, a newsite or blog may display an article (e.g. requested article).

In one example, in step S101 the user requests news article content or blog content or information about one or more products or services. For example, the website might include one or more navigation components for this purpose. Navigation components may include but are not limited to text boxes, menu components, checkboxes and the like.

In step S109, the user terminal plays background music—i.e. one or more audio songs. The playing of the background music may include selection of the song(s) and/or volume parameter and/or song switch parameter (i.e. how often a song is switched from one song to another song, song tempo parameter, etc).

One salient feature of steps S101-S105 is that both the user request as well as the response relate to "non-musical content." (see the definition about) For example, when the user requests information about wine (or other food/beverage products) or about home appliances or about garden products or about pet products or about toys or about health products or about sports products or about outdoors products or about travel services it is clear that the user is not related to music.

In this sense, the music played on the user device in step S109 is at most tangentially related to the non-musical visual content displayed—it is 'ambient music' or 'background music.'

As noted in the earlier sections related to the various 'decision parameter scenarios,' the decision about what songs to serve and/or in what order may be made in accordance with a number of factors. In practice, in many embodiments, this decision may be made according to the combination of some or most or almost all or all of the following parameters(s):

(i) one or more context parameters 310 (see the discussion above and below);

(ii) user-specific identification data and/or sub-population specific data 314—thus, in contrast to certain brick-and-mortar establishments where background music is served to the population as a whole that visits the store or a certain location therein, in some embodiments of the present invention it is possible to selectively 'target' specific background music to specific users or to users exhibiting specific properties. In some embodiments, multiple users who simultaneously visit the 'same location' on a website (for example, in an electronic store) are served different ambient music;

(iii) a static or dynamic business objective function 318 to be optimized; and/or (iv) a theme parameter of the website and/or the one or more non-musical content items (e.g. descriptions of products or services) being displayed on the user terminal according to visual content received from the website.

As noted above, the term 'context parameter' relates to the time-immediate or 'real time' situation in which the user is requesting and/or being served non-musical visual content. Ambient or business or background music may be served according to the context parameter.

It is appreciated that there may be some overlap between certain elements of FIG. 6, and that element depicted as disjoint may not necessarily be disjoint. For example, there may be some overlap between 310 and 314.

Examples of context parameters 310 may include:

(i) overall context parameters (i.e. for the population as a whole)—for example, is the current time/day a weekend or a weekday, summer or winter, early morning or late at night; and (ii) user-specific (or user sub-population specific) context parameters (if known)—for example, when is the most recent time the specific user visited the web-site relative to the 'current time,' how long has the specific user been 'on the site,' how did the user enter the site (i.e. from a general search engine such as google or as a referral from a commercial partner, etc), what was the 'entry point' of the user onto the website (for example, it is possible instead of entering the 'front door'/web site portal, to enter to an 'inner page' or 'deeper page' of the website—for example, a page displaying only one specific brand freezer), how often does the user click during the current session (this may give some indication of the state-of-mind of the user), the etc.

The context parameter may relate to non-musical factors (e.g. when is the last time the user purchased a certain non-musical item such as a household appliance) as well as the musical factors (i.e. what is the average tempo or genre(s) or artist(s) or song(s) of music served to the user over the last 20 minutes).

In addition, certain historical data (i.e. including 'older' history that is older than the 'current session'—for example, by at least a few hours or at least a few days or at least a few weeks or holder) may also play a role (i.e. either purely historical data or information describing a relationship between current-context parameters and historical data).

Element 314 relates to user-specific data (or data specific to a sub-population) including:

(i) general historical information about or behavior patterns of the user—does the specific user typically post comments to the blog or only read the blog, how long has the specific user been 'on the site,' what is the purchase history or browsing history of the user, does the user typically bring 'referrals' of other users, etc.

(ii) demographic information about the user including age, sex, ethnic group, individual or household income;

(iii) 'deviation' parameters describing any deviation from what occurs in general (i.e. historically) and the present context. One example of the 'deviation parameter' relates to the case if the user typically logs in from an Alabama location and is now logging in from the North Eastern USA, this may influence song selection). In another example, the user typically (i.e. according to historical data—this may be the overall historical pattern or some time-limited or otherwise limited historical pattern—for example, weekend vs. weekday purchase habits) browses through the 'sporting good section' of an ecommerce site, and the user in the current session is on the 'toy and baby section' this may influence the choice of song(s) served.

It is recognized that there may be simultaneous users on the web-site, even at the same 'location' on the website. In one example relating to blogs or news sites, the same users are viewing identical news stories or identical blog content.

In one example related to ecommerce or branding web sites, different users on different devices user terminals may browse identical or nearly-identical lists of product or service items of an ecommerce—thus, they may be 'in the same location in the on-line store.' Nevertheless, due to the personalization features related to 314 (or personal elements of other input factors of FIG. 6), multiple users at the 'same location' be served different songs or sequences of songs at the same time.

Element 322 relates to a theme of the non-musical visual content that is displayed on the display screen of the user terminal device. In one example, if currently or previously displayed content or displayable content currently available on the website (i.e. either the content as specific within the website or the content as it relates to the 'non-musical theme' of the website as a whole) relates to household appliances (either appliances in general or specific type of applicant such as an outdoor grill), the input parameter of 322 may relate to household appliances or to the specific type of appliance.

In some embodiments, the overall theme of the website may be determined at least in part based upon the overall content displayed within the website or a portion thereof. For example, the theme of an online 'wine shop' may be different than the theme of an online 'outdoors activity travel agency' and different ambient music may be served accordingly. Furthermore, not all wine shops may have the same themes. For example, an upscale wine shop may be associated with a different them from a discount wine shop—for example, users communicating with the upscale wine shop may, on average, be served classical music more often than users communicating with the discount wine shop. Conversely, users communicating with the discount wine shop may, on average, be served music with a faster tempo than users communicating with the discount wine shop.

Furthermore, the theme may vary within 'different locations' within a given content site. In one example, the portion of a sporting goods branding site relating to baseball products may have a different theme input 322 than a portion of the same sporting goods branding site relating to ski products.

Figure 3:
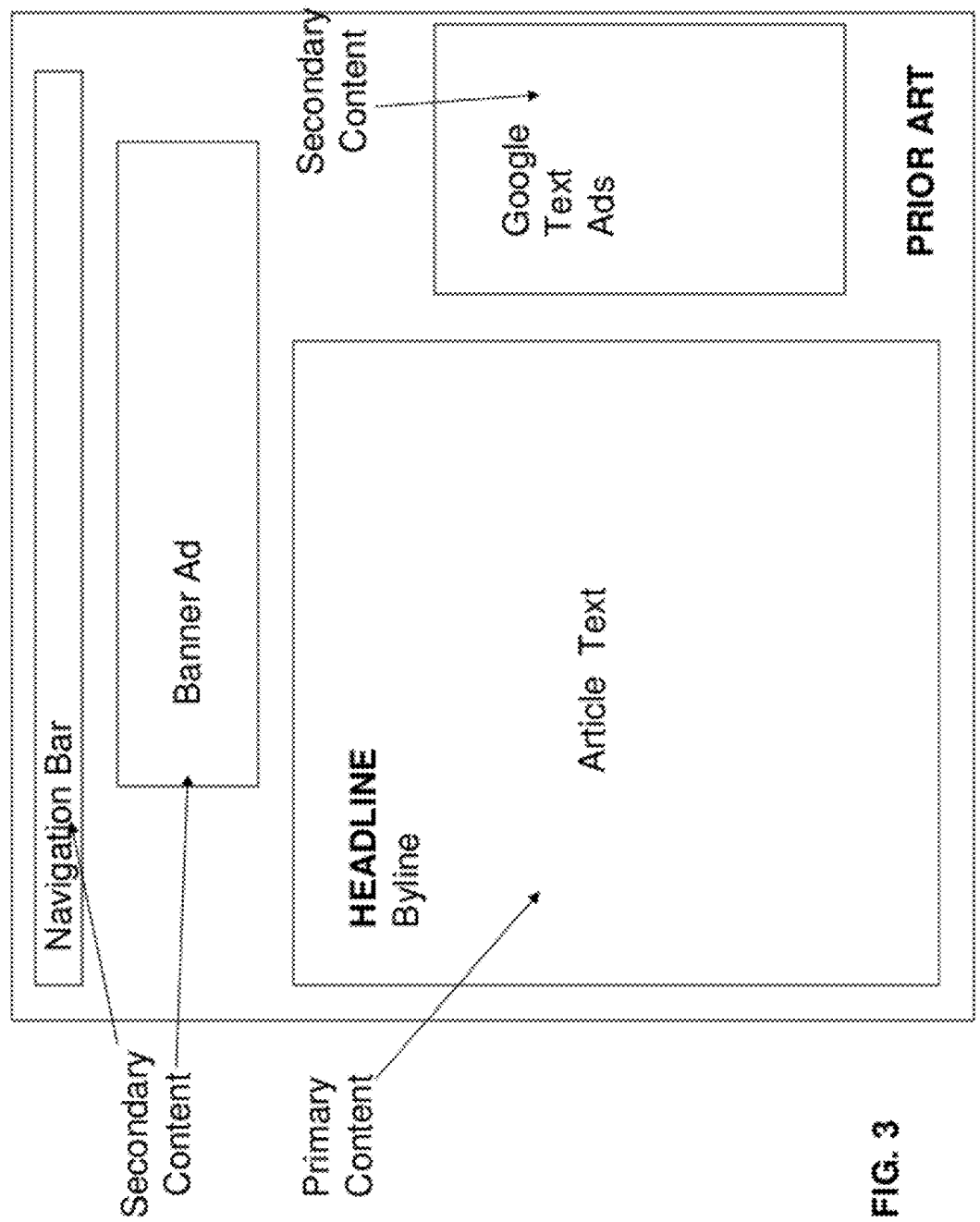
FIG. 3 describe views of a generic news article website (PRIOR ART).
Figure 5:
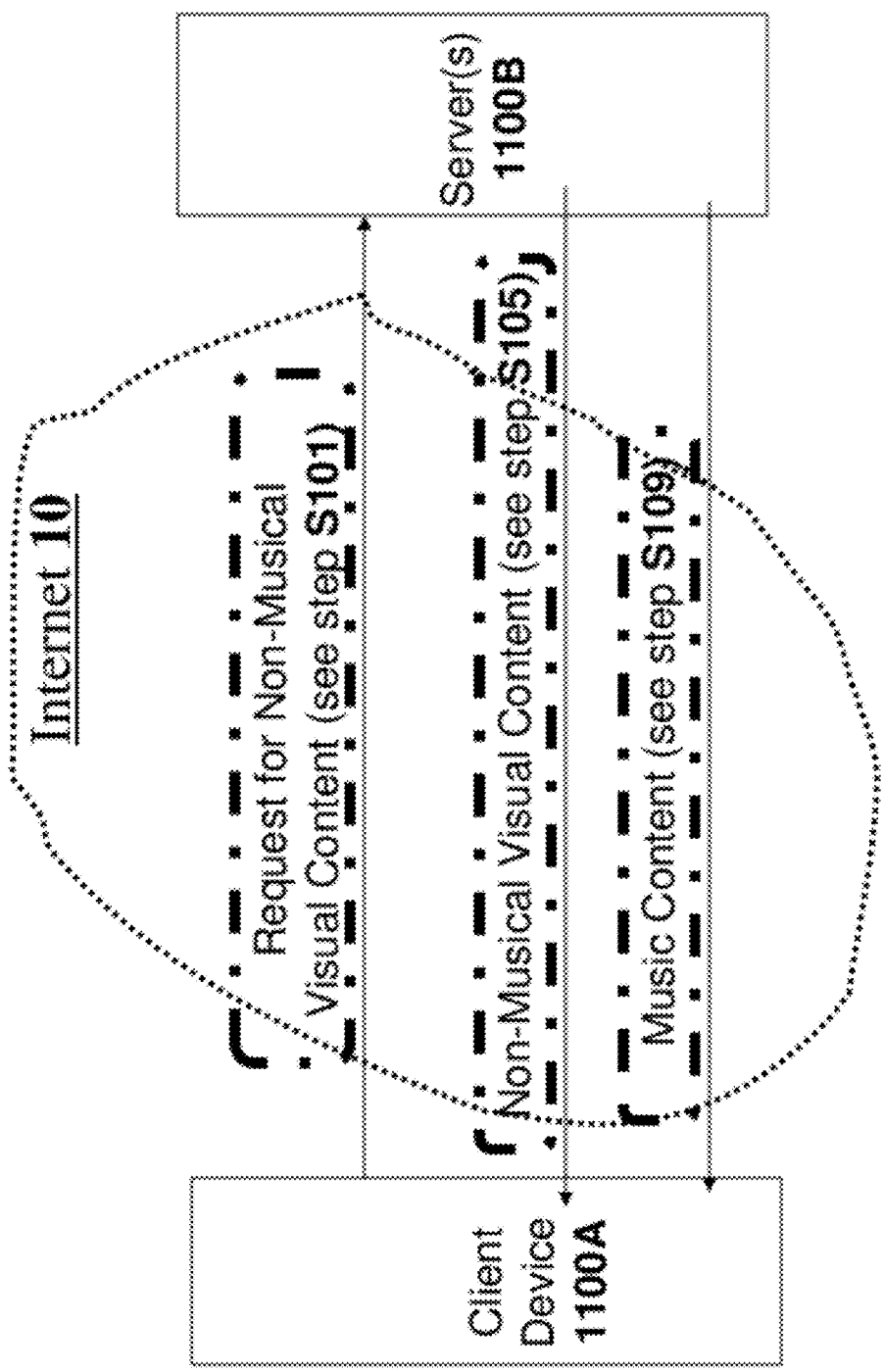

In some embodiments, the theme input 322 of FIG. 5 relates primarily to certain visual content at the expense of other visual content. For example, referring to FIG. 3, it is clear that the 'content weight' of the primary content of the article text will exceed the content weight (if there is any influence whatsoever) of the banner ad or text ad or any other secondary content.

As will be discussed below, in many embodiments, the best results are achieved when a large number of 'input music selection-influencing factors' (i.e. input to music serving/selection component 330) (i.e. different types of input music selection-influencing factors and/or many different factors of specific types) are employed. In these embodiments, some sort of optimization model is used where each input factor is afforded a different 'decision influencing weight.' Thus, in some embodiments, visual content of the website in general, or visual content of the primary display area has a greater influence on (or is afforded a greater weight when selecting music) music selection than the secondary content—the theme parameter(s) are governed by content other than displayed secondary content.

Element 318 relates to a 'business objective function.' For the present disclosure, a 'non-musical business objective function' for selecting music is a function significantly governed by non-musical factors so that music taste (i.e. the user's musical taste) is subservient to other factors. The term 'non-musical' relates to the fact that listening to or purchase of or interacting with music is not the objective—instead, the ambient music is just a tool for the higher objective of the business objective function. User taste or user pleasure plays a role only as it serves the higher purpose, and there are certainly scenarios where the selected song (or song sequence) due to the non-musical business objective function deviates from what would have been selected when musical considerations are primary or dominant.

These business-related 'other factors' of the non-musical business function 318 may play a significant role in song selection and may even dominate the musical considerations.

One example of a 'business objective function' relates to optimization of the expected amount of purchases of non-musical items (i.e. products or services—these products or services are non-musical products and in a context other than music) made by a user on the current web site or in any context as a direct or indirect result of the ambient music served to the user. This may relate to the purchase of non-musical items (i.e. product or services) on the website as a whole, or the purchase of non-musical items that are 'currently displayed' at a time that the ambient music is playing on the user terminal device, or the purchase of non-musical items that are related items of the website In another example, the 'business objective function' may relate to an objective to maximize future (user imminent or long-term future) 'dwell time' (i.e. the amount of time the user spends on a site) on non-musical portions of a website and/or to maximize user clicks or engagement of non-musical content items (e.g. descriptions of products or services, short text entries such as Twitter® entries, longer free text such as blog entries or news articles, etc).

In yet another example, the 'business objective function' may relate to an objective to maximize the chances that the user (or an associated user) will provide a 'referral' to the website in the future—for example, by clicking the 'contact us' link or by posting an online recommendation of the website or its product(s) or service(s).

As noted above, there are situations where a song selected in order to optimize the non-music business objective function would deviate from a song selected to primarily optimize the user's listening pleasure (or for some other primarily musical goal such as the listening to more music or the purchase of a musical item such as an iTune® of the song).

For example, it may be known that a user (or user sub-population or estimated user sub-population) may prefer slow romantic ballads to music with a faster tempo. For example, Amazon.com® (or any other ecommerce site that sells but musical items and non-musical items) may posses data indicating that user has historically frequently purchased album CD-Roms of 'romantic ballads,' and has either never purchased or has purchased only small quantities of faster more upbeat music with a faster tempo.

Nevertheless, if the user is surfing a section of an online store associated with 'impulse purchases,' there may be an indication that serving upbeat faster-tempo music may better serve the non-musical business goal of encouraging an impulse purchase of a non-musical item. For example, the user might have ordered a laptop and the online store might attempt to sell the user a peripheral device such as a printer.

Business-objective functions may relate to increasing site loyalty, increasing user brand awareness and increasing the user satisfaction from a web-site (for example, the users may be given questionnaires to rate satisfaction). For the case of primarily-content sites (e.g. about non-musical content—i.e. news sites, blogs, topic-specific sites (e.g. sites about gadgets, skiing, cycling, sailing, luxury cars, astrology, wines), the business objectives may relate to user loyalty (for example, measured numbers of users that repeat visit and/or the average repeat frequency), reported use experience satisfaction, and user awareness of the 'brand' of the content site.

In accordance with element 314, it may be appropriate to specifically chose the background, ambient upbeat song also according to user specific (or user sub-population specific data). For example, it is possible that a known artist (i.e. BAND XYZ or SINGER LMN) is well-liked by the 'romantic ballad community' because he/she/they have produced both slower romantic songs as well as more upbeat songs with a faster tempo. In this example, in accordance with both 318 and 314, the song selected may be (i) an upbeat song because in this case the goal is to maximize 314 which is to bring about a 'fast purchase' of some sort of purchase item in a 'short time window'; and (ii) nevertheless, a song by the known artist that the user probably likes (i.e. BAND XYZ or SINGER LMN).

In FIG. 6, the music serving/selection component may effect one or more of the following: (i) select a song or artist or genre or song sequence of multiple songs of the same; (ii) select a song version (i.e. some songs have shorter versions and longer remixes); (iii) select an initial song volume (i.e. non-zero volume—obviously, the song would be audible); and (iv) effect a song switch action.

As for (iv), it may be possible that entire songs are usually served to the user—however, in some situations (for example, it seems like the user is not carrying out the desired 'impulse purchase') it may be possible to stop a song before its completion (for example, after at least one third or one half of the song has played), to 'switch the song' and to serve a new song. These 'music serving operation(s) are identified in FIG. 6 as element 340.

It is appreciated that as with any component disclosed herein, the music serving/selection component(s) may include any combination of hardware and computer-readable code, and may be either provided locally or distributed across a local or wide-area computer network. In one non-limiting example, one or more of these components reside on the server(s) 110B.

FIG. 7 is a flow chart of a routine for serving music (i.e. a song, or a sequence of songs) to a user in accordance with some embodiments. As with any routine or method disclosed herein, there is no requirement to carry out every step in every embodiment—furthermore, the order is merely one example, and the skilled artisan will certainly appreciate that other step orders are possible.

Any step of FIG. 7 may be carried out in any location of combination of location(s) and/or at any time.

In step S211, one or more visual content theme parameter(s) (see 322 of FIG. 6) are determined (see the discussion above relating to element 322 of FIG. 6).

In step S215, one or more context parameter(s) are determined (see the discussion above relating to element 310 of FIG. 6).

In step S219, one or more individual user properties or user sub-population are identified (see the discussion above relating to element 314 of FIG. 6).

In step S215, one or more context parameter(s) are determined (see the discussion above relating to element 310 of FIG. 6).

In step S225, one or more non-musical business objective function(s) may be determined. As discussed to a certain extent (see the earlier discussion in the section entitled "Scenario 6 Related to Isolated Music-Selection Criteria") the business objective function is not necessarily static but may dynamically change according to user, user sub-population, time or any other relevant factor.

Sometimes selection of the particular non-musical business objective function may be carried out according to any element 310, 314 and/or 322. In some embodiments, it may change according to a 'value' attributed to this function or according to a chance of successfully achieving the objective. Thus, for certain users who may be written off as a 'lost cause' as far as on-site purchase is concerned, it may be advantageous to focus on maximizing a likelihood of a greater extent of user browsing or surfing non-musical content even at the expense of any chance of increasing the likelihood of purchase of the non-musical item.

Throughout the previous discussions (for example, related to FIGS. 6-7 or any other figures), it is noted that the combination and number of particular scenarios is myriad,—there may be many different categories of users having profiles that may include subtle differences, and many different types of or combinations of visual content theme(s) and/or many different context parameters. Furthermore, the potential business goals may include business goals that contradict each other at least some of the time—for example, the goal of inducing an 'impulse purchase' may, sometimes and for at least some users, contradict the goal of inducing longer 'dwell times' or 'surf times' on the website.

Furthermore, the behavior of some users may influence the behavior of other users through referrals or social network and the like.

As such, in step S229, it may be advantageous to effect one or more global optimization techniques. For example, (i) in some situations it may be preferable to sacrifice an impulse purchase for longer-term goals; (ii) in other situations, it may be preferable to attempt to achieve the impulse purchase (or other immediate 'achievement') even at the expense of the longer-term situation.

In addition, in different situations, different factors may be weighted against each other—for example, one use case may related to a leisure-oriented user who has purchased numerous non-musical leisure products or items (e.g. flights to the Caribbean, tickets to sporting events, junk-food items, etc). Thus, according to element 314, it might be preferable to serve more upbeat music. On the other hand, if this user logs in at a time when leisure products are traditionally not purchased (for example, 7:45 AM on a Monday in the middle of November when the weather is chilly and rainy), it might be advantageous to serve the music slower music to encourage greater browsing or purchase of other products.

In this case, the input parameters of FIG. 6 may contradict each other. Indeed, as the number of distinct input parameters increases (to at least 5 or 10 or 15 or 20 or more), the likelihood of 'contradicting input parameters' may increase.

In some embodiments, in step S229 (to obtain 340 of FIG. 6), it is possible to utilized some sort of statistical and/or heuristic and/or global optimization model in order to handle there types of situations. Possible techniques include but are not limited to:

Possible optimization techniques (i.e. based on 'large-scale quantities of training data' and/or based on 'global considerations' sometimes at the expense of more local considerations) include but are not limited to expert system based techniques, neural networks, Markov models, decision trees, heuristic methods, liner and non-linear programming methods and/or adaptive search techniques (e.g. simulated annealing or genetic algorithms).

These optimization techniques may be resolve situations of 'contradicting inputs to 330' or contradicting combinations of the same.

Figure 8:
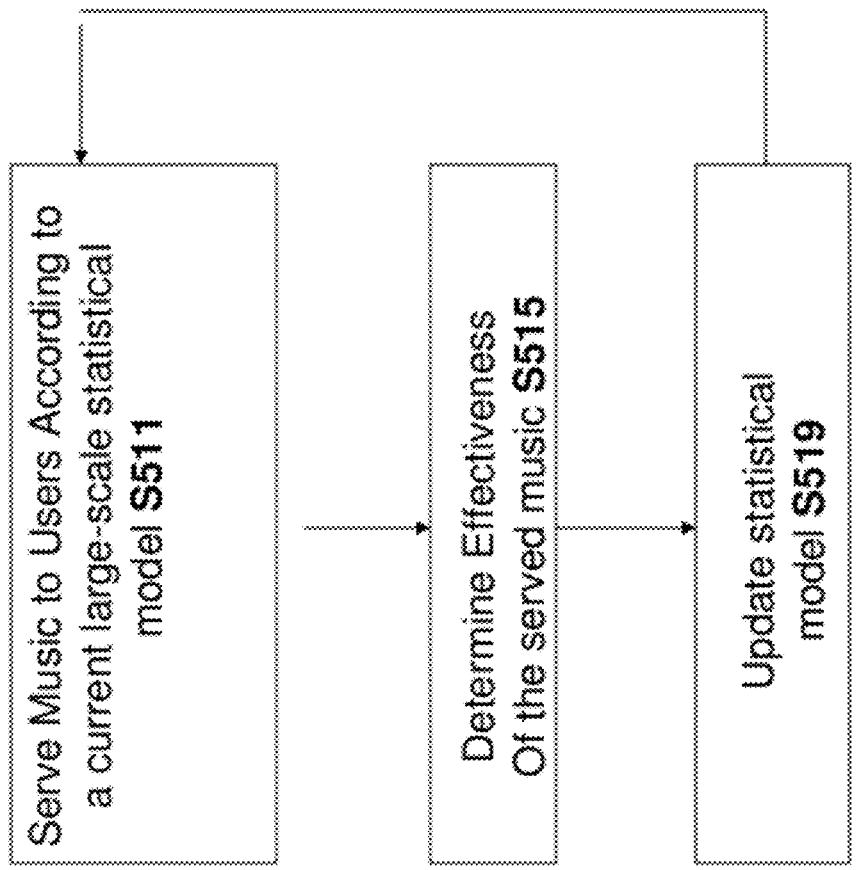

FIG. 8 relates to a routine for 'iterative/learning' routine for serving music in some embodiments of the present invention. In step S511, ambient music (i.e. a sequence of one or more songs) is served to a user according to a current large-scale statistical model. In step S515, is possible to observe the user's behavior and how the user reacts to the situation where ambient music is served. In another example relating to step S515, it is possible to serve different types of users or groups of users. Thus, step S515 may relate to observing the behavior (e.g. surfing behavior of non-musical items or the purchase behavior of non-musical items or any combination thereof) of the user(s)—individual users or sub-populations of users or the overall user population.

The 'metric used' for observing such behavior may relate to one or more of the non-musical business objective functions.

In step S519, it is possible to update the model for serving ambient music in accordance with the observations of step S515. Thus, steps S515 and S519 may relate to training large-scale statistical-based decision models for selecting ambient music to serve to user(s).

Once again, is noted that in the context of large numbers of input parameters or large number of users (or user group) or large numbers of context scenarios and/or theme scenarios, the number of combinations is myriad. Thus, in many embodiments, step S519 is much more complicated than a simple pronouncing that 'the newest Brittany Spears release' encourages people to by more clothes.

Instead, it is possible to make subtle 'tweaks' to complicated large-scale statistical models which change the overall behavior only slightly either for a given user or for a given sub-population of users or for the overall population of all users and/or for certain context(s) or visual content.

In step S511, it is possible to respond to the changing of the large-scale statistical model by utilizing the updated large-scale statistical model.

Figure 9:
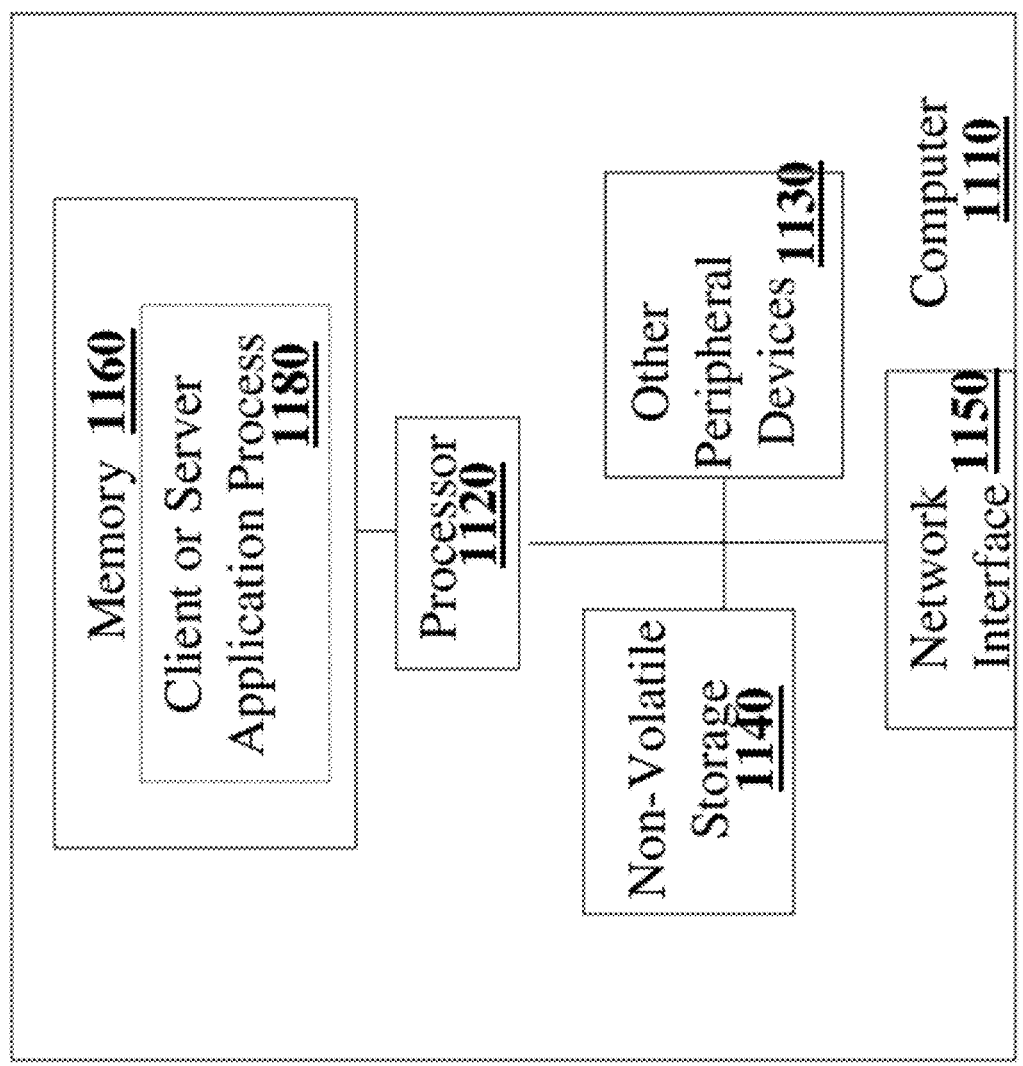

It is noted that as number of techniques may be carried out in the context of step S511-S519:

(i) in step S511, it is possible to intentionally serve (for example, at only somewhat frequent intervals) to a user or sub-population or users or all users a sub-optimal song or series of songs (e.g. from a sub-optimal artist or a sub-optimal tempo or from a sub-optimal genre) in order to 'probe' how the user(s) react in step S515. For example, when the user browses the Spanish winelist, and previous data indicates that Spanish music is superior to Greek music for optimizing a non-music business objective function related to purchase of Spanish wine, it may nevertheless be advantageous (i.e. at some frequency) in step S511 to cause the user's client terminal device to play the Greek song. For example, there may be a new Greek song recently released, and it may be advantageous to 'try' this song (i.e. despite indications that this song will not be successful) in order to attempt to see if surprising results can be obtained. In the event that the results are as expected, then the model may be left alone or merely updated in accordance with the expected (i.e. not to significantly modify the model). Nevertheless, in many situations, the songs which succeed in achieving the non-musical business goals are specifically the ones that according to previous indications, are less likely to success and/or more likely to fail (ii) in one implementation of step S515, it is possible to compare behavior of two groups—a music-served group served a candidate song or sequence of songs with a 'placebo group' that is served more conventional music or only served soft music or not served any ambient music (i.e. substantially silent user terminal);

Discussion of a Computer (FIG. 9)

FIG. 9 is a non-limiting example of a digital computer including memory (volatile or non-volatile 1160, a process 1180 stored in memory, a microprocessor 1120, non-volatile storage 1140, peripheral devices 1130, a wired or wireless network interface 1150. It is appreciate that modification may be made and not every component is required in every embodiment.

A Second Discussion of FIGS. 6-8: Ambient Music for Software Applications

Although the majority examples of the present disclosure documents relate specifically to the case of non-music content of ecommerce and/or branding and/or informational and/or content, various teachings of the present invention may relate to utilizing background or ambient music in the context of business software applications—e.g. in this case, the 'business objective functions' 318 of FIG. 6 may relate to increasing user producing while using the software and/or reducing the number of mistakes.

In one use case, when using a microprocessor (e.g. MS-Word), some goals or sub-goals of the 'business objective functions' 318 may relate to increasing the number of typed characters per minute, decreasing the number of typographic mistakes, decreasing the frequencies where users may need to take breaks, etc.

For banking software or spreadsheet software, the 'business objective functions' 318 may relate to increasing the number of graphs produces or calculations made or business data (e.g. financial data) processed.

Other examples relate to 'software utilities' or to products for computer programmers—for example, Database Administrator (DBA) dashboard utilties, registry tweakers, Zip file utilities, etc.

The business productivity software may reside locally or may remotely (for example, like Google® Apps®).

Thus, in one example, if a user is known to enjoy 'Pink Floyd music,' and if a user has an average typing rate over the past several weeks, then slower Pink Floyd songs are selected when the user types faster than his/her average rate to encourage accuracy, while faster slower Pink Floyd songs are selected when the user types 'too slowly' to encourage greater productivity.

In another example, a user may be 'rewarded' for fast typing with a song that s/he particularly likes (Pavlov's dog effect).

The music may also be related to the theme 322 of the non-musical 'business' text typed—if the text to be typed is non-musical free prose where mistakes are not that critical, faster tempo music may be played. Of course, it is possible to carry out text analyses of the typed text (i.e. free pros where mistakes are less critical vs. legal text where mistakes are critical) using natural language processing computational tools, and then to respond to the results of the analyses by serving music accordingly.

In some embodiments, context parameters may be used—for example, what is the time of the day, how many days are left until a big corporate deadline, what is the rank (or number of years of experience) of the business software user within the company, etc.

Embodiments of the present invention is a method, system and associated software components for providing an appliance, a networked appliance and/or an application running on a networked appliance with one or more sensory stimulation parameters comprising: a. a sensory stimulation device; b. processing circuitry adapted to provide the device with sensory stimulation parameters based on situational parameters, including static situational parameters and variable situational parameters; and c.a software module adapted to monitor the performance of said processing circuitry and further adapted to improve the operation of said processing circuitry.

Figure 10:
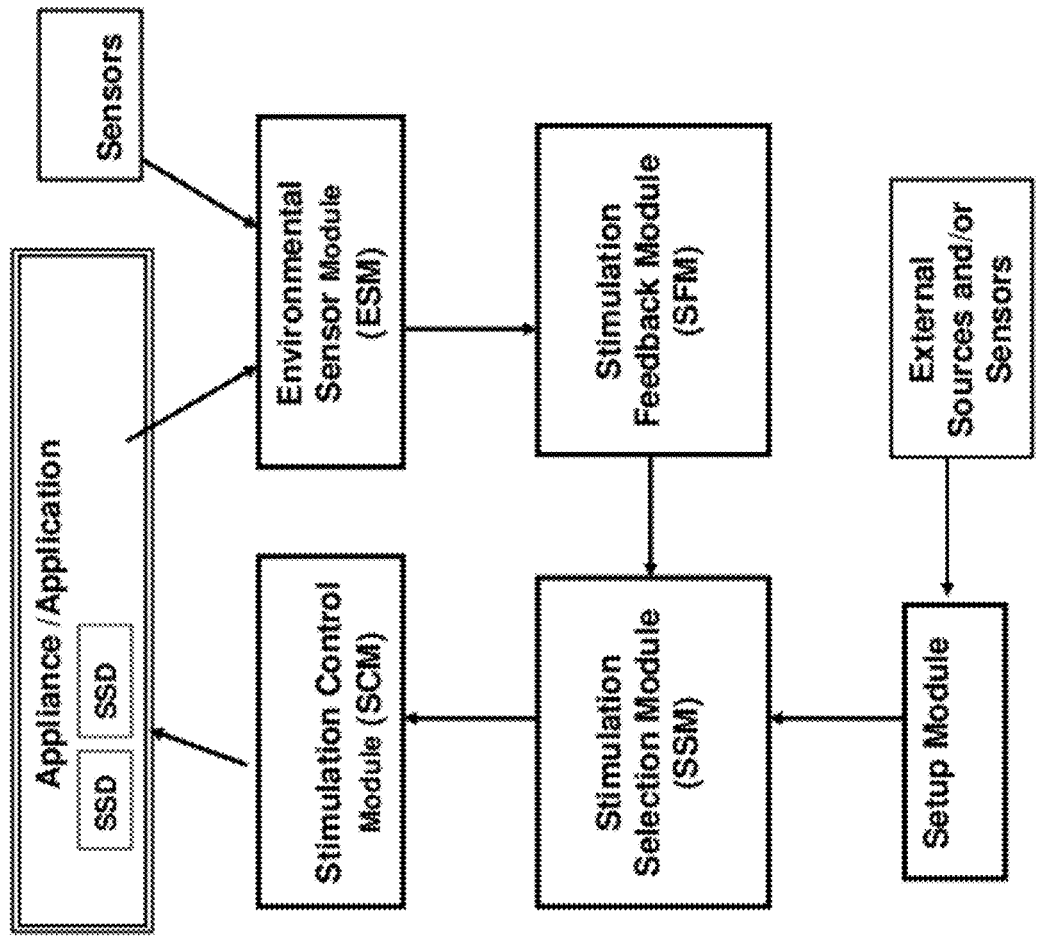
Figure 11:
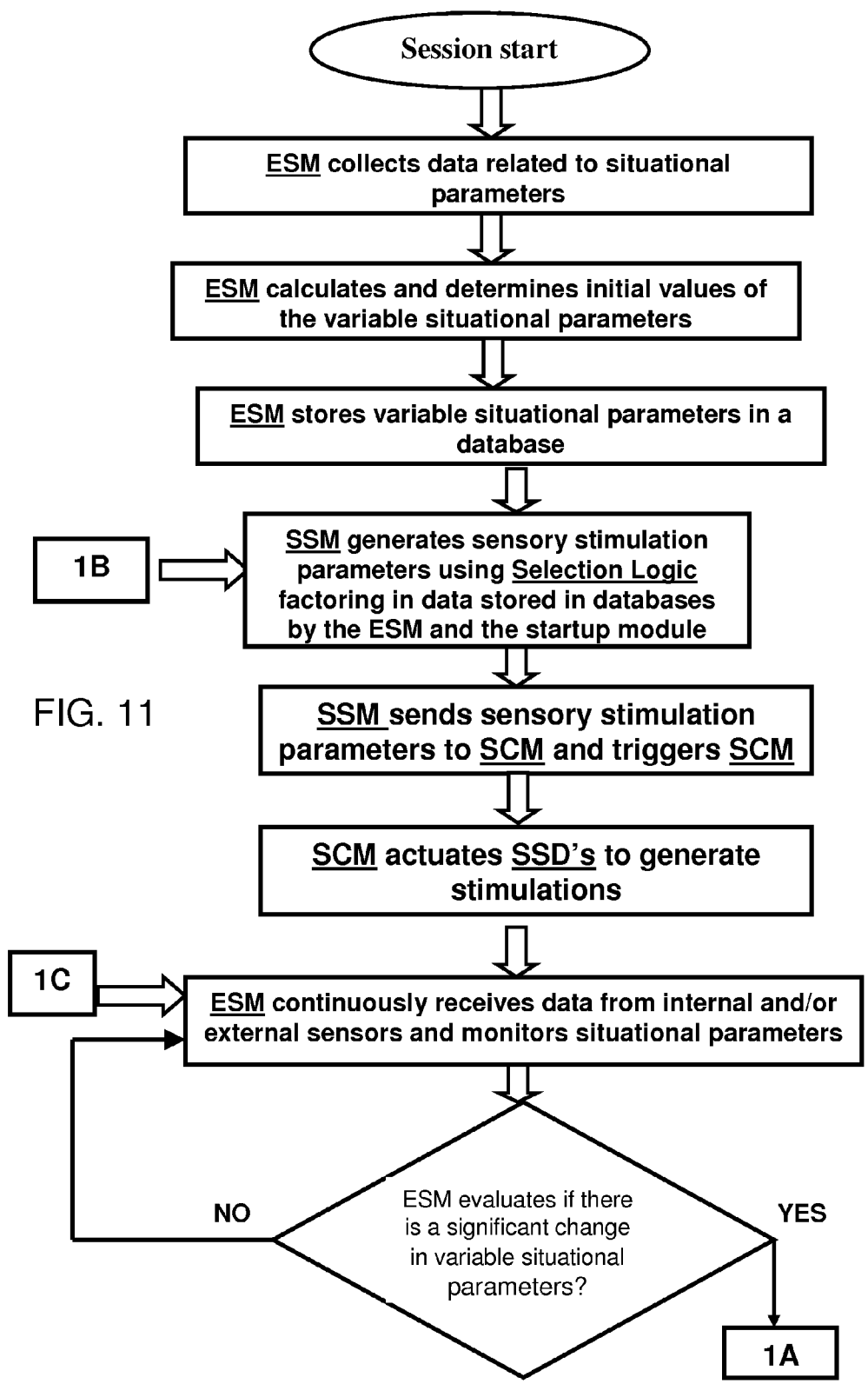
Figure 14:
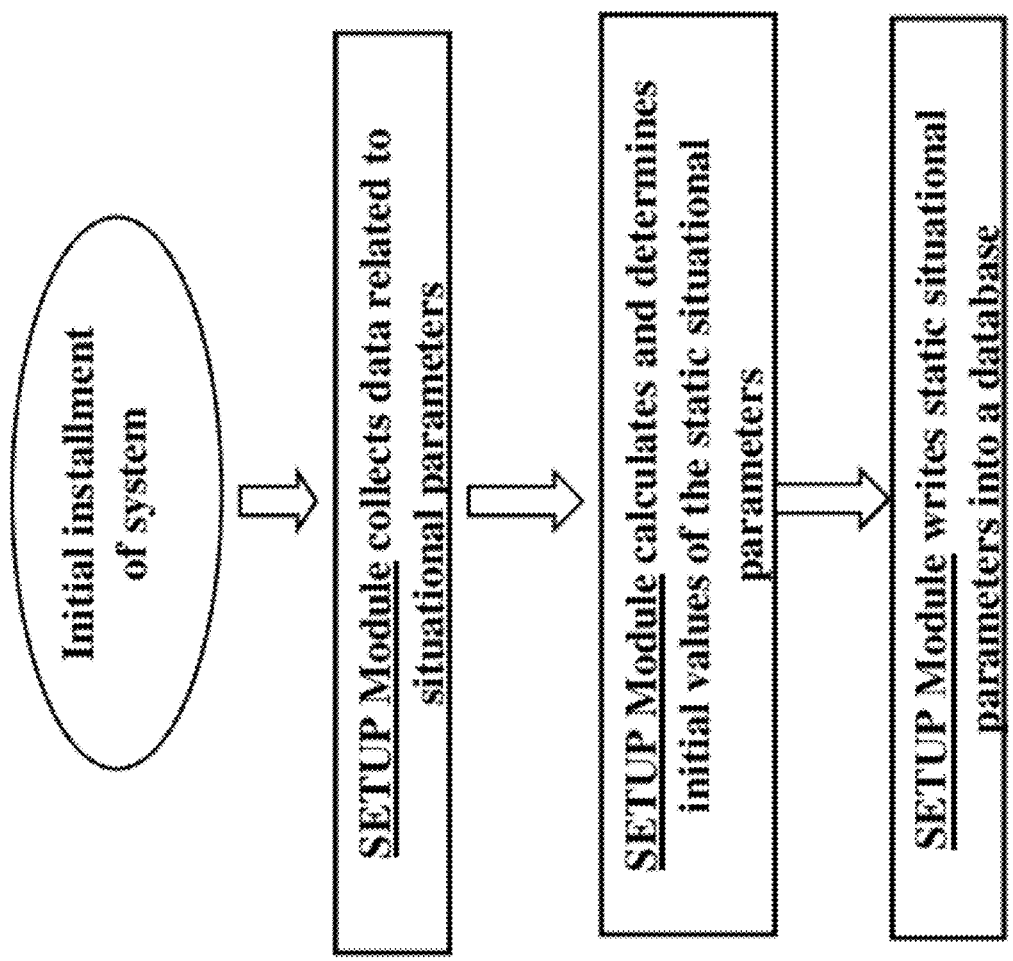

FIG. 10 shows a functional block diagram of an exemplary system for providing sensory stimulation parameters, according to some embodiments of the present invention;

FIGS. 11, 11A & 14 show flowcharts that include steps of the operation of an exemplary system for providing sensory stimulation parameters, according to some embodiments of the present invention.

Figure 13:
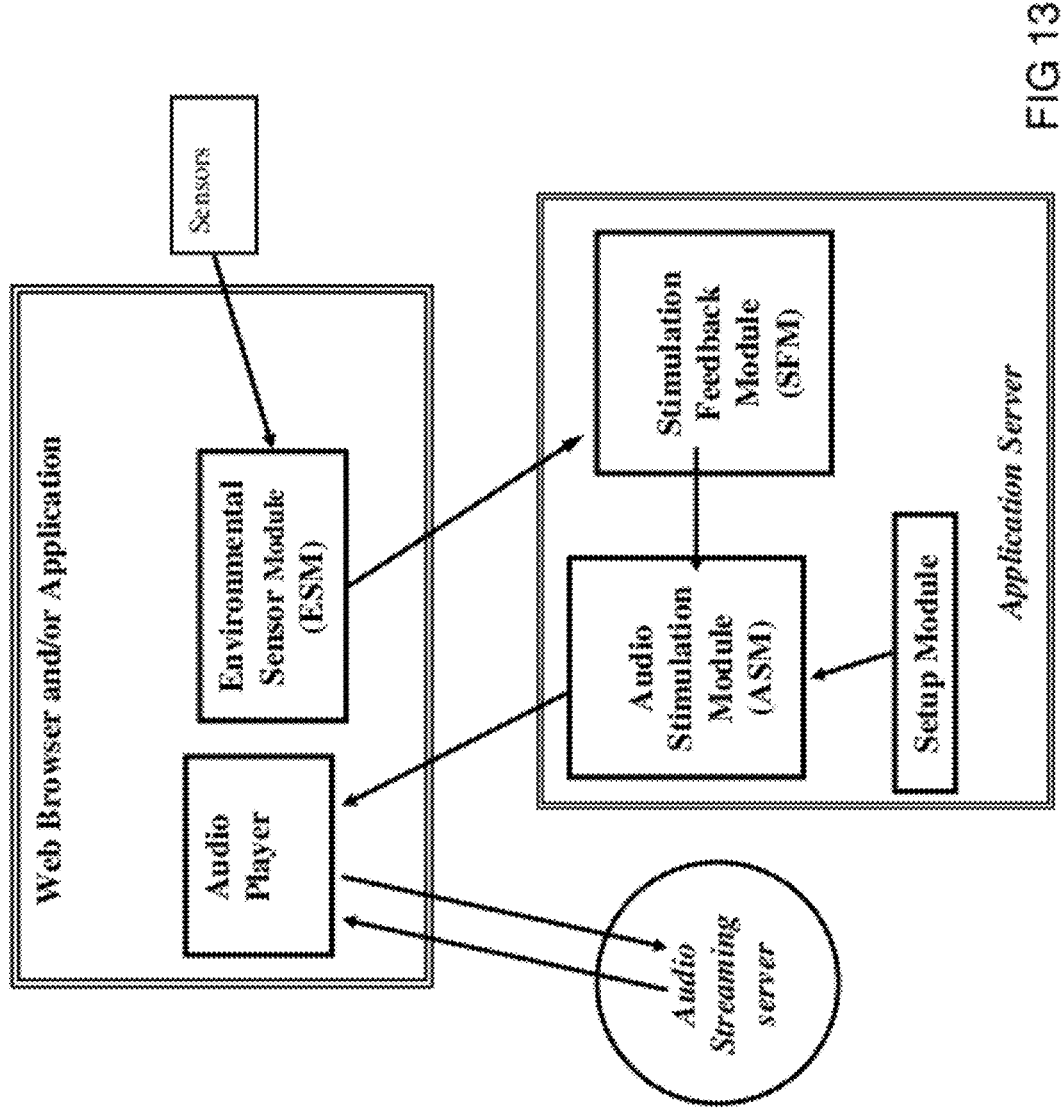

FIG. 12 shows a network diagram of an exemplary system for providing sensory stimulation parameters. Shown are exemplary relations between different end points (e.g. web browser, application, appliance), SSM, SFM, environmental sensors and Setup running on an application server and a web-browser, all according to some embodiments of the present invention;

FIG. 13 shows a functional network diagram of an exemplary system for providing audio content. Shown are exemplary relations between the web-browser, an audio streaming server, an ASM, an ASF, and a Setup running on an application server, all according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Embodiments relate to a method, system and associated software components for providing an appliance, a networked appliance, an application running on a networked appliance (e.g. computer, computer browser, set-top box, cell phones, etc.), a non-networked application and/or a non-networked appliance (e.g. oven, sweeper, watch, application on non-networked computer, etc.), with one or more sensory stimulation parameters (e.g. background music, color scheme, images, videos, scent, layout design, physical form, vibrations, etc.) to be used by the appliance and/or the application.

According to some embodiments of the present invention, there may be provided a Stimulation Selection Module (SSM), residing and/or running on a computational platform (e.g. computer, chipset), which SSM may be adapted to provide an application and/or appliance with sensory stimulation parameters. The SSM may include selection logic which may factor in one or more situational parameters, including variable situational parameters and/or static situational parameters, when selecting sensory stimulation parameters to be provided to the appliance and/or the application. Variable situational parameters may include parameters which may change dynamically and may be categorized into usage parameters, environmental parameters and/or user specific parameters. The usage parameters factored in by the selection logic may include parameters such as: (1) the current type of usage pattern/sequence of the application/appliance, (2) the current content being displayed by the application/appliance, (3) the current application/appliance theme, (4) the current application/appliance layout and design scheme, (5) the duration of the current session of use of the application/appliance and/or (6) any other parameter relating to the specific usage of the application/apparatus. The environmental parameters factored in by the selection logic may include parameters such as: (1) the time, (2) the date, (3) the day of the week, (4) if it Is a weekend or holiday, (5) the weather conditions at the local where the application/appliance is being used, (6) the level and/or type of other sounds that can be heard at the local where the application/appliance is being used, (7) the level and/or type of other scents/smells that can be sensed at the local where the application/appliance is being used, (8) the level and/or type of light that can be seen at the local where the application/appliance is being used, (9) other appliances and/or applications operating at the local where the application/appliance is being used. (10) any other parameter relating to environmental conditions surrounding the application/appliance. The user specific parameters factored in by the selection logic may include parameters such as: (1) the time of day and day of the week at a location associated with the user's IP address, (2) demographic data associated with the location associated with the user's IP address (3) languages associated with the location of the user's IP address (4) data relating to the specific user and/or their past activities, (5) the specific user's usage pattern/sequence of the application/appliance, (6) user explicit and/or implicit preference input (from the current application/appliance or from external sources (e.g. other applications and/or appliances the user may have used), and/or (7) any other parameter relating to the specific user of the application/appliance.

Static situational parameters may include parameters which may be predefined by the application/appliance designer, operator, installer, user, and/or owner and may include parameters such as: (1) the application's/appliance's target demographics, (2) the application's/appliance's target market and the category within the market of products/services targeted, (3) the application's/appliance's typical usage (e.g. interactive, passive, reading, purchasing, etc.), (4) values, colors, images, sounds, and/or smells that the company that owns and/or markets the application/appliance would like users to associate with the appliance/application and/or content presented by the application/appliance (e.g. the Coca Cola company would like to associate the color red with values and sounds of freshness and fun to any application/appliance that is associated with it) (5) the application's/appliance's market positioning and uniqueness (6) the application's/appliance's name (7) fixed sensual parameters (color, images, smell, sound, design, layout, etc.) pre-installed in the application/appliance, (8) the apriori average usage time and pattern of the application/appliance, (9) the desired mood and ambience (10) the goals of the application/appliance and/or the stimulation (11) operator inputs and/or preferences and/or (12) any other parameter related to the application's/appliance's purpose relevant to the selection of sensory stimulation parameters.

According to some embodiments of the present invention, there may be provided one or more Sensory Stimulation Devices (SSD's) (e.g. displays, speakers, etc.). The one or more SSD's may be adapted to stimulate one or more of the human senses. According to some embodiments of the present invention, the SSD's may be integral with the application/appliance and/or may be external devices.

According to some further embodiments of the present invention, based on the output of the selection logic (i.e. indication of selected sensory stimulations), the SSM may, directly, through a Stimulation Control Module (SCM) and/or using a third party service, upload, stream and/or otherwise provide the stimulation parameters to the SSD's. The SCM may control the SSD's through drivers, API's, controllers and/or through other devices functionally associated with the appliance/application.

According to some embodiments of the present invention, there may be provided a Stimulation Feedback Module (SFM) functionally associated with the Stimulation Selection Module, which SFM may reside and/or run on a computational platform (e.g. computer, chipset). The SFM may, intermittently or substantially continuously, receive performance parameters and/or significant changes in situational parameters from one or more Environmental Sensor Modules (ESM's), which ESM's may measure situational parameters for one or more applications and/or appliances.

According to some embodiments of the present invention, the ESM's may receive data relating to situational parameters from one or more sensors, which sensors may be integral with the application/appliance and/or may be external devices. The sensors may include cameras, proximity detectors, microphones, odor sensors, keyloggers and/or any other sensor known today or that will be devised in the future, that collects data relating to situational parameters.

The SFM may receive performance parameters and/or any significant change in the situational parameters from ESM's relating to one or more applications and/or appliances. The SFM may analyze the performance parameters and/or any significant change in the situational parameters, accordingly monitoring the SSM's performance and may consequently improve its performance. According to some embodiments of the present invention the SFM may store in a database the data relating to the performance of the SSM under the situational parameters and may change decision rules. The stored information may be used by the SSM to improve its performance. The SFM may use algorithms and methods that are similar to those of the selection logic and may add and/or change rules, weights, parameters and/or methods that serve the selection logic and/or the SFM itself. According to some embodiments of the present invention, following significant changes in the situational parameters, the SFM may actuate the SSM to generate new sensory stimulation parameters under the changed situational parameters.

According to some embodiments of the present invention, the SSM may include selection logic that may be based on dynamic and/or adaptive algorithms based on rules. Initially, a setup process may determine a possible range of values for the static situational parameters and may further determine initial values of the variable situational parameters. According to further embodiments of the present invention, The ESM may, for every session, usage, and/or other operation determine initial values of the variable situational parameters. According to some embodiments of the present invention, the variable situational parameters may vary in each session, usage and/or other relevant operation, whereas the static situational parameters may be determined and stay constant for longer periods of time (e.g. at first time installation, once a year, after a major change, and/or at specific application/appliance owner request).

According to some embodiments of the present invention, the selection logic may determine the sensory stimulation parameters using the following algorithm. In principle the selection logic may choose a set of stimulation parameters ($S1, S2, S3, \ldots$) that will maximize the goals (hence: business value) of the application/appliance owner and/or the user under the current context of variable situational parameters, while complying to constraints ($c1, c2, c3, \ldots$). The algorithm may function as follows: (1) use one or more ESM's to measure the variable situational parameters; (2) scan all stimulation parameter combinations and choose the combination of sensory stimulation parameters (S1, S2, S3, ...) that comply to constraints (c1, c2, c3, ...) and have the maximum business value under similar situational parameters; (3) use one or more ESM's to measure the new (post stimulation of step (2)) situational parameters, and assign the de facto, new business value under the new situational parameters to the combination (S1, S2, S3, ...) chosen in step (2).

For example (S1, S2, ...) could be lists of songs to be played on a tourist's cruise website. The constraints may be: (c1) play songs in the language prominent in the location of the user, (c2) Play songs with a tempo of N1 BPM (Beats Per Minute) to N2 BPM (because this was concluded from the hour of the day and/or site owner brand values/request), (c3) genre of music should be Jazz or classic (concluded from site owner brand values), etc. The site is an informational site so the business goal may be to maximize the staying time of the user at the site and/or increase the site's brand values.

For each chosen (S1, S2, ...) play list, the ESM may measure the actual staying time under the values of all situational variable parameters (e.g. section the user visited on the site, other background sounds). The results are transferred to the SFM which updates the rule base and/or add a statistical records that indicate that the chosen (S1, S2, ...) play list, under the values of the situational parameter (static and variable) achieved the measured staying time (N seconds), such that the next operation of the selection logic will bring better results.

According to some further embodiments of the present invention, the selection logic may try to optimize the runtime and/or the results of the selection process of sensory stimulation parameters by using one or more optimization methods for choosing the preferred sensory stimulation parameters from some a set of available alternatives. Some optimization methods may include expert system based techniques, heuristic methods, liner and non-linear programming methods and/or adaptive search techniques.

According to some embodiments of the present invention, there may be provided a Setup Module residing and/or running on a computational platform (e.g. computer, chip set). The Setup Module may be adapted to determine and assign initial values (setup values) to static situational parameters and/or variable situational parameters to be factored in by the selection logic. According to further embodiments of the present invention, the setup module may collect data relating to the specific implementation of the SSM and accordingly determine and assign initial values to the situational parameters to be factored in by the specific selection logic associated with the specific SSM in question. The collected data may include: an interview, an interactive computational process (e.g. questionnaire), relevant data retrieval from external databases, interrogation process of appliance/application to extract sensory parameters capabilities and/or related built-in attributes or features, data from sensors, technical and semantical structure of the appliance/application, technical implementation methods or tools used by the appliance/application, outgoing and ingoing links from the appliance/application to other related appliances/applications, existing database records and analysis of the application/appliance, explicit and/or implicit deductions from similar appliance/applications, de facto, past users behavior and/or environmental measurements. The Setup module may use some of the algorithmic methods that are used by the SSM in order to calculate and optimize the initial values assigned to the situational parameters.

It should to be clear to one of skill in the art that the designation of the different described modules (e.g. SSM, SFM, DCM, ESM, Setup, etc.) is arbitrary and that any function performed by one may be performed by another. It should also be understood by one of skill in the art that the functionality attributed to any two or more modules may be integrated into a single module. Conversely, the functionality of any one module may be split into two or more separate components. It should also be understood by one of skill in the art that each module may be implemented as one or more different software components, some of which may be running on the application/appliance and some of which may be running on a remote networked application, server and/or appliance.

According to some embodiments of the present invention, where the sensory stimulation parameters are audio content (e.g. music, sounds), the Stimulation Selection module (SSM) may be referred to as an Audio Selection Module (ASM). According to some embodiments of the present invention, where the networked appliance is a computational platform running a web-browser, the ASM may be functionally associated with a website accessed by a web-browser. Accordingly, some embodiments of the present invention may include methods, systems and associated software components for providing website audio content (e.g. one or more music clips that may be mixed into a play list and/or one, combined, audio footage). The ASM may reside and/or run on a computational platform (e.g. computer) functionally associated with a server of the website. The ASM may include selection logic which may factor in one or more variable situational parameters and/or static situational parameters when selecting audio content to be played on the website. Variable situational parameters may include parameters which may change dynamically and may be categorized into site specific parameters, environmental parameters and/or user specific parameters. The site specific parameters factored in by the selection logic may include parameters such as: (1) the current context and/or content displayed on the website, (2) the website's theme, (3) the website's layout, (4) the website's color, images, videos and design scheme, (5) the pattern/sequence in which the user navigated through the website (e.g. from what page and/or context the user arrived to the current page and/or status), (6) the duration of the current session on the website and/or (7) any other parameter relating to the website relevant to audio content selection. The environmental parameters factored in by the selection logic may include parameters such as: (1) the time, (2) the date, (3) the day of the week, (4) if it is a weekend or holiday, (5) the sounds being emitted from other applications running on the user's device, (6) other applications running on the user's device and/or (7) any other parameter relating to the user's environment relevant to audio content selection. The user specific parameters factored in by the selection logic may include parameters such as: (1) the time of day and day of the week at the local from which the user is accessing the web site (may be determined according to the location associated with the user's IP address or otherwise), (2) demographic data relating to the specific user (may be determined according to the location associated with the user's IP address or otherwise). (3) languages associated with the specific user (may be determined according to the location associated with the user's IP address or otherwise), (4) data relating to the specific user and/or his/her past activity on the system (e.g. repeat user? type of browser the user is employing?, usage patterns, etc.), (5) the user's current pattern/sequence of application/site activities, (6) the user's explicit and/or implicit preferences and/or inputs (from the current site or from external sources (e.g. other sites, other applications) and/or (7) any other parameter relating to the specific user relevant to audio content selection. Static situational parameters may include parameters which may be predefined explicitly or implicitly by the website's designer, operator, installer, user, and/or owner and may include parameters such as (1) the website's business goals, (2) the website's target demographics, (3) the website's target market and the category within the market of products/services targeted, (4) the website's typical usage (e.g. interactive, passive, reading, purchasing, etc.), (5) values, colors, images, videos, sounds, smells that the website owner would like users to associate with the content of the website (e.g. the Coca Cola company would like to associate the color red with values and sounds of freshness and fun to any object in their site), (6) the website's market positioning and uniqueness (7) the website's name and/or slogan (8) the apriori average usage time and pattern of the website, (9) the desired mood and ambience, (10) the goals for which the audio content is being selected (11) the sounds, images, videos, colors and other ambience parameters used on other venues associated with the website (e.g. the company offices, stores, advertisements, competitors websites, etc.) (11) operator inputs and/or preferences and/or (12) any other parameter related to the website's purpose relevant to the selection of audio content.

According to some embodiments of the present invention, there may be provided a Stimulation Feedback Module (SFM) functionally associated with the ASM, which ASM may reside and/or run on a computational platform (e.g. computer, chipset). The SFM may, intermittently or substantially continuously, receive performance parameters and/or significant changes in situational parameters from one or more Environmental Sensor Modules (ESM's), which ESM's may collect and measure variable situational parameters for one or more websites. The SFM may receive performance parameters and/or any significant changes in the situational parameters from ESM's relating to one or more websites.

According to some embodiments of the present invention, the ESM's may receive data relating to situational parameters from one or more sensors, which sensors may be integral with the website and/or may be external devices. The sensors may include cameras, proximity detectors, microphones, odor sensors, keyloggers and/or any other sensor known today or that will be devised in the future, that collects data relating to situational parameters.

The SFM may analyze the performance parameters and/or any significant change in the situational parameters, accordingly monitoring the ASM's performance and may consequently improve its performance. According to some embodiments of the present invention the SFM may store in a database the reported performance stimulation parameters under the situational parameters and may accordingly change decision rules. The stored information may be used by the ASM to improve its performance. The SFM may use algorithms and methods that are similar to those of the selection logic and may add and/or change rules, weights, templates and/or methods that serve the selection logic and/or the SFM itself. According to some embodiments of the present invention, following significant changes in the situational parameters, the SFM may actuate the ASM to generate new stimulation parameters under the changed situational parameters.

According to some embodiments of the present invention, the ASM may include selection logic that may be based on dynamic algorithms based on rules. Initially, a setup process may determine a possible range of values for the static situational parameters and may further determine initial values of the variable situational parameters. According to further embodiments of the present invention, The ESM may, for every session, usage, and/or other operation determine initial values of the variable situational parameters. According to some embodiments of the present invention, the selection logic may determine the audio content using the following algorithm. In principle the selection logic may choose a set of audio clips (S1, S2, S3, ... ) that will maximize the goals (hence: business value) of the application/appliance owner and/or the user under the current context of variable situational parameters, while complying to constraints (c1, c2, c3, ... ). The algorithm may function as follows: (1) use one or more ESM's to measure the variable situational parameters; (2) scan all audio clip combinations and choose the combination of audio clips (51, S2, S3, ... ) that comply to constraints (c1, c2, c3, ... ) and have the maximum business value under the same situational parameters; (3) use one or more ESM's to measure the new (post stimulation of step (2)) variable situational parameters, and assign the de facto, new business value under the new situational parameters to the combination (S1, S2, S3, ... ) chosen in step (2).

For example, we will demonstrate the process of using the system to provide audio stimulation for the website of the well known Royal Caribbean cruises, located at http://www.royalcaribbean.com/. This example does not demonstrate the full comprehensive process, but gives a simplified version in order to further elucidate the current invention. As part of the SETUP process, performed by the setup module, the site owner may be interviewed, using an interactive, online questionnaire in order to determine situational parameters. Examples of possible questions may be: What are the sociodemographic characteristics of your customers?, what are your brand's main values?, what is unique about your products?, what countries your customers come from?, what existing colors, audio and other ambience elements are you already using?, what are your company's main goals and what are the goals of your site?, What kind of ambience you would like to be associated with (prestigious, popular, stylish, fresh, young,)?, what is the current average spent time at the site?, how many repeat users do you have and what is their repetition pattern?, special event?, dates?, etc. Following the questionnaire, there is a straight forward logic at the setup process that determines some of the situation parameters and their possible range of values. Let's assume in our example that analyzing the questionnaire the system concluded that (1) the Music genre will be Jazz or Chill-out (this is because the site is in the category of luxury vacations/tourism and targets ages of over 50 and already uses a lot of this music on its ships), (2) BPM will be slow at 75-100 from 6 AM till 4 PM (user's local time) and for the rest of the day faster at 100-135 BPM, (3) tracks maximum length will be 3 minutes (because today's users spend under 5 minutes at the site and we would like to have at least 2 almost full clips), (4) May use songs with lyrics in English or in the language of the origin country of the specific website user (because most of the targeted audience is from the US or Anglo-saxon countries), and (5) the business goal is to generate audio ambience that will maximize the time users spend on the site. An ESM may be implemented as a software component (e.g. Java script, Flash component) that is embedded within the web page that is served to the user and rendered using a web browser. When a user enters the site, the ESM, may receive from the web browser details regarding the user's IP address (from which we can infer, in very high probability, the local time, date, country, the user's language, etc.) Using a browser cookie or Flash local object mechanism, the ESM can get information whether this is a repeat user and some past information regarding the specific user. The ESM will determine these variable situational parameters and will actuate the ASM. The ASM will use the selection logic to generate the optimal play list. The Selection logic will first query the audio database for possible audio clips that comply with the situational variable's possible values (genre=Jazz or Chill-out, BPM will be 75-100 BPM (assuming user's local time is morning hours), Lyrics=English or Hindi (assuming user's IP indicates he is surfing from India, etc). Afterwards, the selection logic will choose the play list that statistically, on average, generates the longest spent time at the site by using the databases that contain performance results from previous usage of play lists from this site and others. In the case that there are too many combinations to consider, the selection logic may use algorithms (described above) that can generate optimal results in relative low runtime. Following that, the selected play list is streamed to the user (using the site's web server or using a third party server) using the audio player which is a software component (actually implemented as a combined component with the ESM), that is embedded within the webpage and can play music using the user's speakers. The ESM continuously monitors the user's behavior within the site. If a significant event happens (e.g. user indicated, using a special control on the audio player component, he would like a different genre/play list, user has stayed longer than the average time and the play list is about to end, user stopped the music (using a control on the audio player component)), then the ESM will notify the SFM and send the SFM the full event details and the value of all situational parameters. The SFM will update the central database with the de facto performance of the chosen play list under the situational parameters (e.g. Using the play list that contains song#7, song#19 and song#11 the user stayed at the site for 247 seconds when the user was from England, used the website at 11:25 AM, used English language, etc.). If needed the SFM will actuate the ASM in order to generate a new, revised play list (e.g. the current play list about to end) that will give optimal results for the new situational parameters (e.g. if a user wanted a different play list, the SSM will choose candidates that are from a different genre and music clips from the previously played).

According to some embodiments of the present invention the selection logic may try to optimize the runtime of the selection process of audio content by using one or more optimization methods for choosing the preferred audio content from some a set of available alternatives. Some optimization methods may include expert system based techniques, heuristic methods, liner and non-linear programming methods and/or adaptive search techniques.

According to some further embodiments of the present invention, there may be provided an Audio player, running within the web browser or application. The Audio player may receive directly from the ASM pointers to one or more selected audio content to be played on the website. The Audio player may use the browser or a third party application within the browser or a third party stand-alone application to play the selected audio content.

According to some embodiments of the present invention, there may be provided a Setup Module residing and/or running on a computational platform (e.g. computer, chipset). The Setup Module may be adapted to determine and assign initial values (setup values) to static situational parameters and/or variable situational parameters to be factored in by the selection logic. According to further embodiments of the present invention, the setup module may collect data relating to the specific implementation of the ASM and accordingly determine and assign initial values to the situational parameters to be factored in by the specific selection logic associated with the specific ASM in question. The collected data may include: an interview, an interactive computational process (e.g. questionnaire), relevant data retrieval from external databases, sensors, semantic analysis of the website, technical structure of the website, site content structure, site technical implementation methods, outgoing and ingoing links from the website and/or existing database records, de facto, past user behavior, explicit and/or implicit deductions from similar websites and applications, and/or environmental measurements). The setup module may use some of the algorithmic methods that are used by the SSM in order to optimize the initial values assign to the situational parameters. The variable situational parameters may vary in each session, usage and/or other relevant operation, whereas the static situational parameters may be determined and stay constant for longer periods of time (e.g. at first time installation, once a year, after major changes, and/or at specific application/appliance owner request).

Based on the output of the selection logic (i.e. indication of selected audio content), the Audio Selection Module (ASM) may, directly, through an Audio player and/or a media server, upload or stream the selected audio content to the accessing web-browser. According to further embodiments of the present invention, the ASM may signal a content server application, running on the same or on a functionally associated computational platform, to upload or stream the selected content to the web-browser. The selected audio content may reside on the application web server and/or on one or more networked servers or appliances, some of them may relate to $3^{rd}$ party applications.

It should to be clear to one of skill in the art the designation the different describes modules (e.g. ASM, SFM, Audio player, SSD, ESM, Setup) is arbitrary and that any function performed by one may be performed by another. It should also be understood that the functionality attributed to any two or more modules may be integrated into a single module. Conversely, the functionality of any one module may be split into two or more separate components. It should also be understood that each module may be implemented as one or more different software components, some (if any at all) of them running at the web browser or application and some (if any at all) are running at a remote networked web server or application server.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. A method comprising:
   a) for each non-musical product or non-musical service item of a plurality of items, causing a user terminal in communication with one or more servers via a computer network to display a respective description of the product or service items so that multiple descriptions are displayed in a single batch; and
   b) causing the user terminal to play one or more audio songs at a time that is simultaneous with the displaying of step (a), the audio songs selected in accordance with the combination of:
      i) a theme describing the one or more of the displayed non-musical product or service items;
      ii) user-specific or user terminal-specific personal data associated with the user terminal or the user; and
      iii) a non-musical business objective function related to future nonmusical purchasing activity or future estimated non-musical surfing activity.

2. The method of claim 1 wherein the method is carried out such that:
  i) items whose description is displayed in step (a) are explicitly requested by the user in an explicit user request; and
  ii) the selection of the ambient music is carried out such that the explicitly-request items have a greater weight than other information or other items displayed on the screen.

3. The method of claim 1 wherein the method is carried out such that:
  i) descriptions of at least some of the items of step (a) are displayed in a primary display region of a screen of the user display; and
  ii) the selection of the ambient music is carried out such that preference is given to the primary display region of the screen at the expense of region outside of the primary display region.

4. The method of claim 1 wherein the business objective function optimizes a global estimated future dwell time of a website of the displayed items of step (a) by the user or a global estimated future purchase parameter of the website the user at the expense of local estimated future dwell time or purchases of any item displayed in step (a).

5. The method of claim 1 wherein at least some of the user-specific data is selected from group consisting of:
  i) a foreign country or foreign time zone of the user terminal;
  ii) an estimated age of a user of the user terminal;
  iii) an estimated household or personal income of a user of the user terminal; and
  iv) a web-navigation path to the informational website which presents the nonmusical product or service items.

6. The method of claim 1 wherein the song selection is carried out according to a large scale statistical model.

7. The method of claim 1 wherein the large-scale statistical model is periodically updated according to detected user behavior to iteratively train, updated and use the updated/trained model.

8. The method of claim 1 wherein the song selection is carried out according to one or more context factors specific to the current session.

9. A method comprising:
  a) displaying, on a user terminal, non-musical textual content including a multi-sentence article or a multi-sentence blog entry; and
  b) causing the user terminal to play one or more audio songs at a time that is simultaneous with the displaying of step (a), the audio songs selected in accordance with the combination of:
    i) a non-musical theme of the textual content;
    ii) user-specific or user terminal-specific personal data associated with the user terminal or the user; and
    iii) a business objective function related to future estimated surfing activity on a site of the non-musical textual content and/or dwell time reading the current-displayed non-musical textual content.

10. A method comprising:
  a) causing a user terminal to play a plurality of audio songs to a user at a time when the user terminal is locally or remotely running a business-productivity software application;
  b) for each audio song, acquiring a respective productivity metric describing user productivity and/or user accuracy at a time that the audio song is playing on the user terminal;
  c) correlating audio song features with user productivity using the business productivity software application; and
  d) at a later time, in accordance with the results of the correlating, causing the user terminal to play background music when the user terminal is, at the later time, locally or remotely running a business-productivity-software application.

11. The method of claim 10 wherein the business productivity software is selected from the group consisting of:
  i) a word processing application;
  ii) an email application;
  iii) a software utility application;
  iv) a development environment;
  v) a graphical art generation application; and
  vi) a spreadsheet application.

* * * * *